United States Patent
Matthai et al.

(10) Patent No.: US 11,291,302 B2
(45) Date of Patent: *Apr. 5, 2022

(54) FURNITURE SYSTEM

(71) Applicant: HERMAN MILLER, INC., Zeeland, MI (US)

(72) Inventors: John Matthai, Holland, MI (US); Joshua DeWys, Marne, MI (US); Joel Ruiter, Ada, MI (US); Michael Katje, Grand Haven, MI (US); Peter Keyzer, Caledonia, MI (US); Michael A. Johnson, West Olive, MI (US); Taiyoh Afrik, Holland, MI (US)

(73) Assignee: HERMAN MILLER, INC., Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,725

(22) Filed: Nov. 23, 2020

(65) Prior Publication Data

US 2021/0068539 A1  Mar. 11, 2021

Related U.S. Application Data

(63) Continuation of application No. 15/987,489, filed on May 23, 2018, now Pat. No. 10,842,266.

(51) Int. Cl.
*A47B 37/00* (2006.01)
*A47B 83/00* (2006.01)
(Continued)

(52) U.S. Cl.
CPC .............. *A47B 83/001* (2013.01); *A47B 9/20* (2013.01); *A47B 41/02* (2013.01); *A47B 97/00* (2013.01);
(Continued)

(58) Field of Classification Search
CPC ............ A47B 83/001; A47B 2083/003; A47B 2200/0052; A47B 2200/0066;
(Continued)

(56) References Cited

U.S. PATENT DOCUMENTS

| 1,520,518 A | 12/1924 | Thomason |
| 2,565,784 A | 8/1951 | Sheean |

(Continued)

FOREIGN PATENT DOCUMENTS

| JP | H07276262 A | 10/1995 |
| JP | 2009095360 A | 5/2009 |

(Continued)

OTHER PUBLICATIONS

International Search Report with Written Opinion for related Application No. PCT/US21/12944 dated Mar. 25, 2021 (13 Pages).

*Primary Examiner* — Matthew W Ing
(74) *Attorney, Agent, or Firm* — Michael Best & Friedrich LLP

(57) ABSTRACT

A furniture system includes an elongated chase having a body extending from a first end to a second end. The body has an upper surface and a lower surface. A first leg is coupled to the lower surface of the body and a second leg is coupled to the lower surface of the body and spaced apart from the first leg. Power cables are positioned within a cavity of the body, the power cables configured to connect to a building's power supply. A modular power unit is coupled to the lower surface of the body. The modular power unit includes a power outlet electrically coupled to the power cables.

20 Claims, 13 Drawing Sheets

(51) Int. Cl.
*A47B 41/02* (2006.01)
*A47B 97/00* (2006.01)
*A47B 9/20* (2006.01)
*H01R 25/00* (2006.01)
*H02G 11/00* (2006.01)

(52) U.S. Cl.
CPC ...... *H01R 25/006* (2013.01); *A47B 2083/003* (2013.01); *A47B 2097/003* (2013.01); *A47B 2200/0052* (2013.01); *A47B 2200/0066* (2013.01); *A47B 2200/0081* (2013.01); *A47B 2200/0082* (2013.01); *H02G 11/00* (2013.01)

(58) Field of Classification Search
CPC .... A47B 2200/0081; A47B 2200/0082; A47B 2200/0086; A47B 2097/003; A47B 9/14; A47B 9/20; A47B 97/00; A47B 41/02; H01R 25/006; H02G 11/00
See application file for complete search history.

(56) References Cited

U.S. PATENT DOCUMENTS

| | | |
|---|---|---|
| 2,798,172 A | 2/1955 | Jones |
| 2,705,179 A | 3/1955 | Hodgin |
| 2,821,450 A | 8/1956 | Knoll |
| 2,836,475 A | 5/1958 | Sapp |
| 2,979,686 A | 5/1959 | Longmire |
| 3,342,147 A | 9/1967 | Shettles |
| 3,463,099 A | 8/1969 | Doucette |
| 3,915,100 A | 10/1975 | Sullivan |
| 4,105,351 A | 8/1978 | Anderson |
| 4,165,908 A | 8/1979 | Cooper et al. |
| 4,296,524 A | 10/1981 | Horholt et al. |
| 4,325,597 A | 4/1982 | Morrison |
| 4,382,642 A | 5/1983 | Burdick |
| 4,408,543 A | 10/1983 | Griffin |
| 4,409,906 A | 10/1983 | Alneng |
| 4,546,889 A | 10/1985 | Schoumaker |
| 4,567,698 A | 2/1986 | Morrison |
| 4,591,289 A | 5/1986 | Vickers et al. |
| 4,600,173 A | 7/1986 | Frascaroli et al. |
| 4,635,492 A | 1/1987 | Uebelhart |
| 4,665,836 A | 5/1987 | Burr |
| 4,748,913 A | 6/1988 | Favaretto et al. |
| 4,838,177 A | 6/1989 | Vander Park |
| 4,915,034 A | 4/1990 | Grabe et al. |
| 5,086,597 A | 2/1992 | Kelley et al. |
| 5,103,741 A | 4/1992 | Grund et al. |
| 5,117,599 A | 6/1992 | Voss |
| 5,144,888 A | 9/1992 | Heine et al. |
| 5,152,698 A | 10/1992 | Juhlin et al. |
| 5,172,530 A | 12/1992 | Fishel et al. |
| 5,182,996 A | 2/1993 | Gutgsell |
| 5,186,425 A | 2/1993 | Keusch et al. |
| 5,277,005 A | 1/1994 | Hellwig et al. |
| 5,277,007 A | 1/1994 | Hellwig et al. |
| 5,309,686 A | 5/1994 | Underwood et al. |
| 5,328,260 A | 7/1994 | Beirise |
| 5,339,747 A | 8/1994 | Epps |
| 5,391,088 A | 2/1995 | Tomchak et al. |
| 5,428,928 A | 7/1995 | Hellwig et al. |
| 5,438,937 A | 8/1995 | Ball et al. |
| 5,537,290 A | 7/1996 | Brown et al. |
| 5,560,302 A | 10/1996 | Diffrient et al. |
| 5,568,773 A | 10/1996 | Hung |
| 5,792,541 A | 8/1998 | Herrera |
| 5,794,545 A | 8/1998 | McDaniel et al. |
| 5,906,420 A | 5/1999 | Rozier, Jr. et al. |
| 5,943,966 A | 8/1999 | Machado et al. |
| 5,947,628 A | 9/1999 | Hansen |
| 5,957,061 A | 9/1999 | Chang |
| 5,984,566 A | 11/1999 | Blaha |
| 6,017,228 A | 1/2000 | Verbeek et al. |
| 6,021,866 A | 2/2000 | Meeks |
| 6,032,590 A | 3/2000 | Chen |
| 6,076,317 A | 6/2000 | Hellwig et al. |
| 6,085,668 A | 7/2000 | Kanki |
| 6,158,358 A | 12/2000 | Prendergast |
| 6,167,664 B1 | 1/2001 | Reuter et al. |
| 6,170,410 B1 | 1/2001 | Gioacchini et al. |
| 6,182,581 B1 | 2/2001 | Boyce |
| 6,244,467 B1 | 6/2001 | Lewit et al. |
| 6,253,509 B1 | 7/2001 | Hellwig et al. |
| 6,298,946 B1 | 10/2001 | Yemini et al. |
| 6,324,997 B1 | 12/2001 | Baker |
| 6,367,211 B1 | 4/2002 | Weener et al. |
| 6,382,109 B1 | 5/2002 | Novikoff |
| 6,397,762 B1 | 6/2002 | Goldberg et al. |
| 6,415,723 B1 | 7/2002 | Kopish et al. |
| 6,435,106 B2 | 8/2002 | Pentel |
| 6,464,516 B2 | 10/2002 | Baldock |
| 6,543,845 B2 | 4/2003 | Seitz et al. |
| 6,598,542 B2 | 7/2003 | Goldberg et al. |
| 6,717,049 B1 | 4/2004 | Makwinski |
| 6,725,784 B2 | 4/2004 | Crinion |
| 6,911,597 B2 | 6/2005 | Seamans et al. |
| 6,935,247 B2 | 8/2005 | Schaefers et al. |
| 6,968,790 B1 | 11/2005 | Kocsis |
| 7,347,493 B2 | 3/2008 | Mulmed |
| 7,410,373 B2 | 8/2008 | Isaacks |
| 7,557,309 B2 | 7/2009 | Ross et al. |
| 7,665,255 B2 | 2/2010 | Dressendorfer et al. |
| 7,703,398 B2 | 4/2010 | Brauning et al. |
| 7,765,937 B2 | 8/2010 | Weissenrieder et al. |
| 7,766,125 B2 | 8/2010 | Fowler |
| 7,806,474 B2 | 10/2010 | Wahl et al. |
| 7,950,336 B2 | 5/2011 | Phillips |
| 7,966,951 B1 | 6/2011 | Black et al. |
| 7,975,624 B2 | 7/2011 | Henriott |
| 8,132,371 B2 | 3/2012 | Golinski et al. |
| 8,196,526 B2 | 6/2012 | Rheault et al. |
| 8,347,796 B2 | 1/2013 | Udagawa |
| 8,439,164 B1 | 5/2013 | Esposito |
| 8,584,598 B2 | 11/2013 | Derkoski |
| 8,616,921 B2 | 12/2013 | Byrne et al. |
| 8,708,103 B2 | 4/2014 | Bulley |
| 8,915,198 B2 | 12/2014 | Massimini |
| 8,925,469 B2 | 1/2015 | Bennie et al. |
| 9,161,623 B1 | 10/2015 | Lin |
| 9,247,812 B2 | 2/2016 | Parshad |
| 9,284,729 B2 | 3/2016 | Von Hoyningen Huene et al. |
| 9,427,083 B2 | 8/2016 | Dame et al. |
| 9,488,204 B2 | 11/2016 | King |
| D783,319 S | 4/2017 | Udagawa et al. |
| D786,587 S | 5/2017 | Udagawa et al. |
| D787,240 S | 5/2017 | Udagawa et al. |
| 9,681,763 B2 | 6/2017 | Udagawa et al. |
| 9,685,730 B2 | 6/2017 | Jones et al. |
| 9,730,513 B2 | 8/2017 | Udagawa et al. |
| D796,216 S | 9/2017 | Rockwell et al. |
| 9,765,518 B2 | 9/2017 | Von Hoyningen Huene et al. |
| D799,861 S | 10/2017 | Krusin |
| D800,459 S | 10/2017 | Rockwell et al. |
| 9,803,361 B2 | 10/2017 | Von Hoyningen Huene et al. |
| 9,808,953 B1 | 11/2017 | Sagorski |
| 9,968,187 B2 | 5/2018 | Udagawa et al. |
| 10,045,609 B1 | 8/2018 | Insua |
| 10,842,266 B2 | 11/2020 | Matthai et al. |
| 2003/0020381 A1 | 1/2003 | Cattaneo |
| 2003/0089283 A1 | 5/2003 | Okamoto et al. |
| 2005/0284341 A1 | 12/2005 | Klassy et al. |
| 2006/0042520 A1 | 3/2006 | Stevens et al. |
| 2006/0096506 A1 | 5/2006 | Brauning et al. |
| 2006/0102056 A1 | 5/2006 | Wolfe |
| 2007/0277710 A1 | 12/2007 | Gray et al. |
| 2008/0276841 A1 | 11/2008 | Brauning et al. |
| 2008/0295745 A1 | 12/2008 | Hamilton et al. |
| 2009/0042428 A1 | 2/2009 | Henriott et al. |
| 2009/0273260 A1 | 11/2009 | Kemp |
| 2009/0293773 A1 | 12/2009 | Miller et al. |
| 2010/0024687 A1 | 2/2010 | Preiss |
| 2010/0024688 A1 | 2/2010 | Kitada et al. |
| 2010/0171398 A1 | 7/2010 | Berthiaume et al. |

(56) References Cited

U.S. PATENT DOCUMENTS

| | | |
|---|---|---|
| 2011/0226165 A1 | 9/2011 | Ballard |
| 2011/0272213 A1 | 11/2011 | Taron |
| 2011/0297052 A1 | 12/2011 | Martin et al. |
| 2011/0298339 A1 | 12/2011 | Udagawa et al. |
| 2012/0103234 A1 | 5/2012 | Schiavello et al. |
| 2014/0001822 A1 | 1/2014 | Thorson et al. |
| 2014/0106610 A1 | 4/2014 | Byrne et al. |
| 2014/0238277 A1 | 8/2014 | Fishman et al. |
| 2014/0283715 A1 | 9/2014 | Sevadjian |
| 2014/0366782 A1 | 12/2014 | Battey |
| 2016/0079721 A1 | 3/2016 | Jones et al. |
| 2016/0255957 A1 | 9/2016 | Tsuchiyama et al. |
| 2016/0345724 A1 | 12/2016 | White et al. |
| 2016/0348358 A1 | 12/2016 | Udagawa et al. |
| 2017/0290418 A1 | 10/2017 | Udagawa et al. |
| 2017/0354247 A1 | 12/2017 | Matthai et al. |
| 2019/0246791 A1 | 8/2019 | Lundberg et al. |
| 2019/0357676 A1 | 11/2019 | Matthai et al. |
| 2021/0106133 A1 | 4/2021 | Anderson et al. |
| 2021/0204690 A1 | 7/2021 | Lim |
| 2021/0330074 A1 | 10/2021 | LaDuke et al. |

FOREIGN PATENT DOCUMENTS

| | | |
|---|---|---|
| WO | 9719617 A2 | 6/1997 |
| WO | WO0013548 A1 | 9/1998 |
| WO | WO0191609 A2 | 12/2001 |
| WO | 2004008911 A2 | 1/2004 |
| WO | WO2007114774 A1 | 10/2007 |
| WO | WO2018101875 A1 | 6/2018 |

FURNITURE SYSTEM

CROSS-REFERENCE TO RELATED APPLICATIONS

This application is a continuation of U.S. Non-Provisional patent application Ser. No. 15/987,489 filed on May 23, 2018, the entire contents of which are incorporated herein by reference.

BACKGROUND

The present invention relates to a furniture system, and more particularly to a furniture system for distributing power to workstations.

A furniture system, for example, for an office setting, may be created by furniture items forming different workstations. The furniture items may be adjustable for the entire system or for individual workstations. Furthermore, the furniture system may be configured to provide and support large amounts of power to the workstations from the building's power supply.

SUMMARY

In one embodiment, the invention provides a furniture system including an elongated chase having a body extending from a first end to a second end. The body has an upper surface and a lower surface. A first leg is coupled to the lower surface of the body, and a second leg is coupled to the lower surface of the body and spaced apart from the first leg. Power cables are positioned within a cavity of the body, the power cables configured to connect to a building's power supply. A modular power unit is coupled to the lower surface of the body. The modular power unit includes a power outlet electrically coupled to the power cables.

In another embodiment, the invention provides a furniture system including an elongated chase having a body extending from a first end to a second end. The body has an upper surface and a lower surface. A first leg is coupled to the lower surface of the body, and a second leg is coupled to the lower surface of the body and spaced apart from the first leg. Power cables are positioned within a cavity of the body, the power cables extending from the cavity and through the first leg for connection to a building's power supply. A power outlet is supported by the elongated chase and electrically coupled to the power cables.

In yet another embodiment, the invention provides a furniture system including a first elongated chase having a first body extending from a first end to a second end. The first body has a first upper surface and a first lower surface. The furniture system further includes a second elongated chase adjacent the first elongated chase, the second elongated chase including a second body extending from a third end to a fourth end. The second body having a second upper surface and a second lower surface. The first and second elongated chases together define a longitudinal axis. A first leg is coupled to the first end of the first elongated chase, and a second leg is coupled to the fourth end of the second elongated chase. A storage unit is positioned beneath the second end of the first elongated chase and the third end of the second elongated chase between the first and second legs. The first and second elongated chases are supported by the storage unit.

In yet still another embodiment, the invention provides a furniture system including an elongated chase having a body extending from a first end to a second end, the body having an upper surface and a lower surface. The upper surface defines a slot extending from the first end to the second end. A leg is coupled to the lower surface of the body adjacent the first end. A table is coupled to the slot and extends outwardly away from the elongated chase. A storage unit is positioned beneath the lower surface of the body adjacent the second end to support the second end.

In another embodiment, the invention provides a furniture system including an elongated chase having a body extending from a first end to a second end, the body having an upper surface and a lower surface. The upper surface defines a plurality of slots extending from the first end to the second end. A first leg is coupled to the lower surface of the body. A second leg is coupled to the lower surface of the body and spaced apart from the first leg. Power cables are positioned within a cavity of the body, the power cables extending from the cavity and through the first leg for connection to a building's power supply. A table is coupled to one of the plurality of slots and extends outwardly away from the elongated chase. A modular power unit is coupled to the lower surface of the body adjacent the table, the modular power unit including a power outlet electrically coupled to the power cables. A workstation accessory is coupled to another of the plurality of slots and positioned adjacent the table. A storage unit is positioned beneath the lower surface of the body between the first leg and the second leg In yet another embodiment, the invention provides a height adjustable desk including a tabletop having a front edge configured to be adjacent a user, a rear edge opposite the front edge, a first side edge extending between the front edge and the rear edge, and a second side edge extending between the front edge and the rear edge. A first leg assembly is coupled to a bottom surface of the tabletop proximate to and inset from the first side edge, the first leg assembly operable to extend and retract. A second leg assembly is coupled to the bottom surface of the tabletop proximate to and inset from the second side edge, the second leg assembly operable to extend and retract. A first storage element is mounted to the bottom surface of the tabletop between the first side edge and the first leg assembly. A second storage element is mounted to the bottom surface of the tabletop between the second side edge and the second leg assembly.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
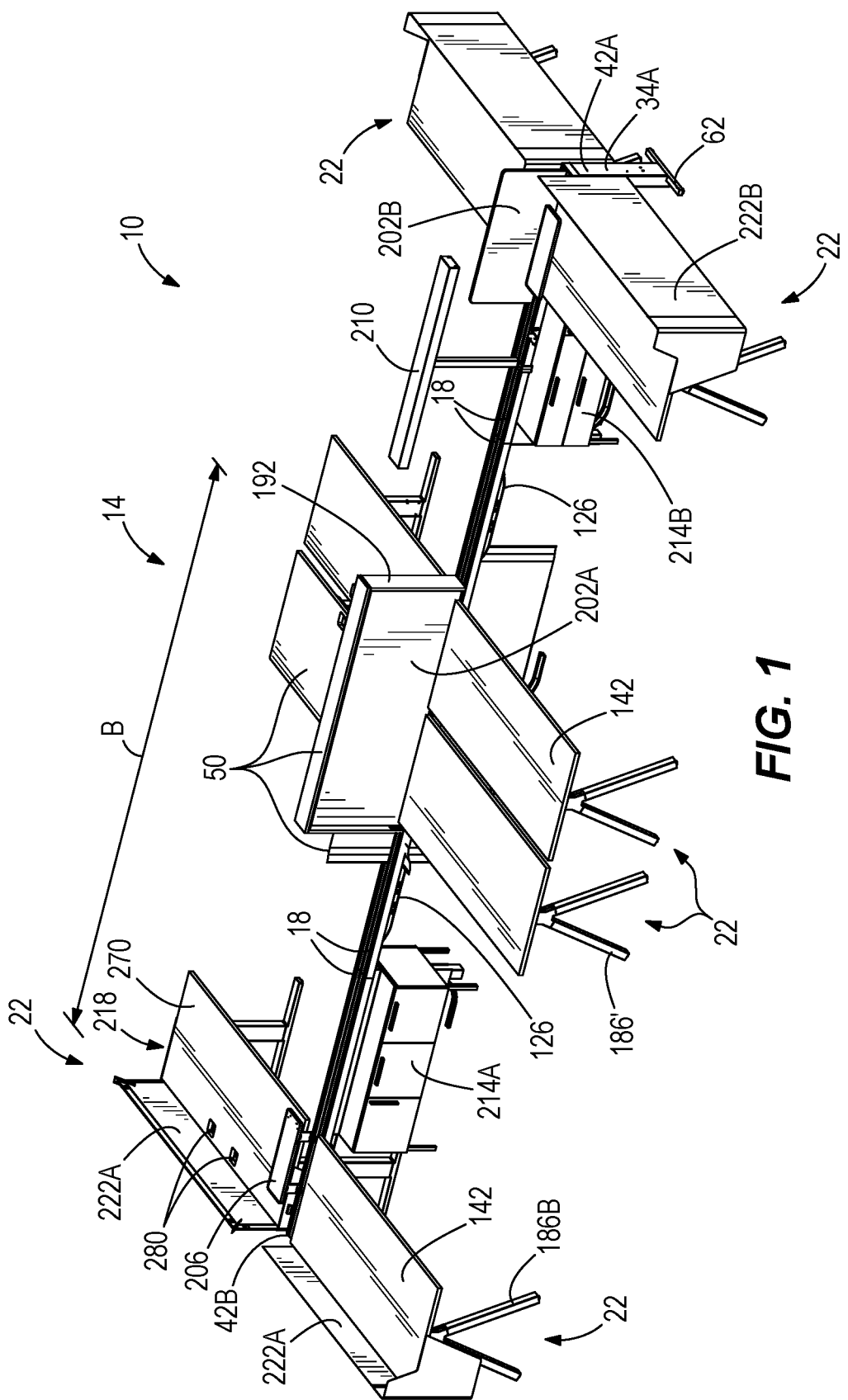
FIG. 1 is a perspective view of a furniture system embodying the invention.
Figure 2:
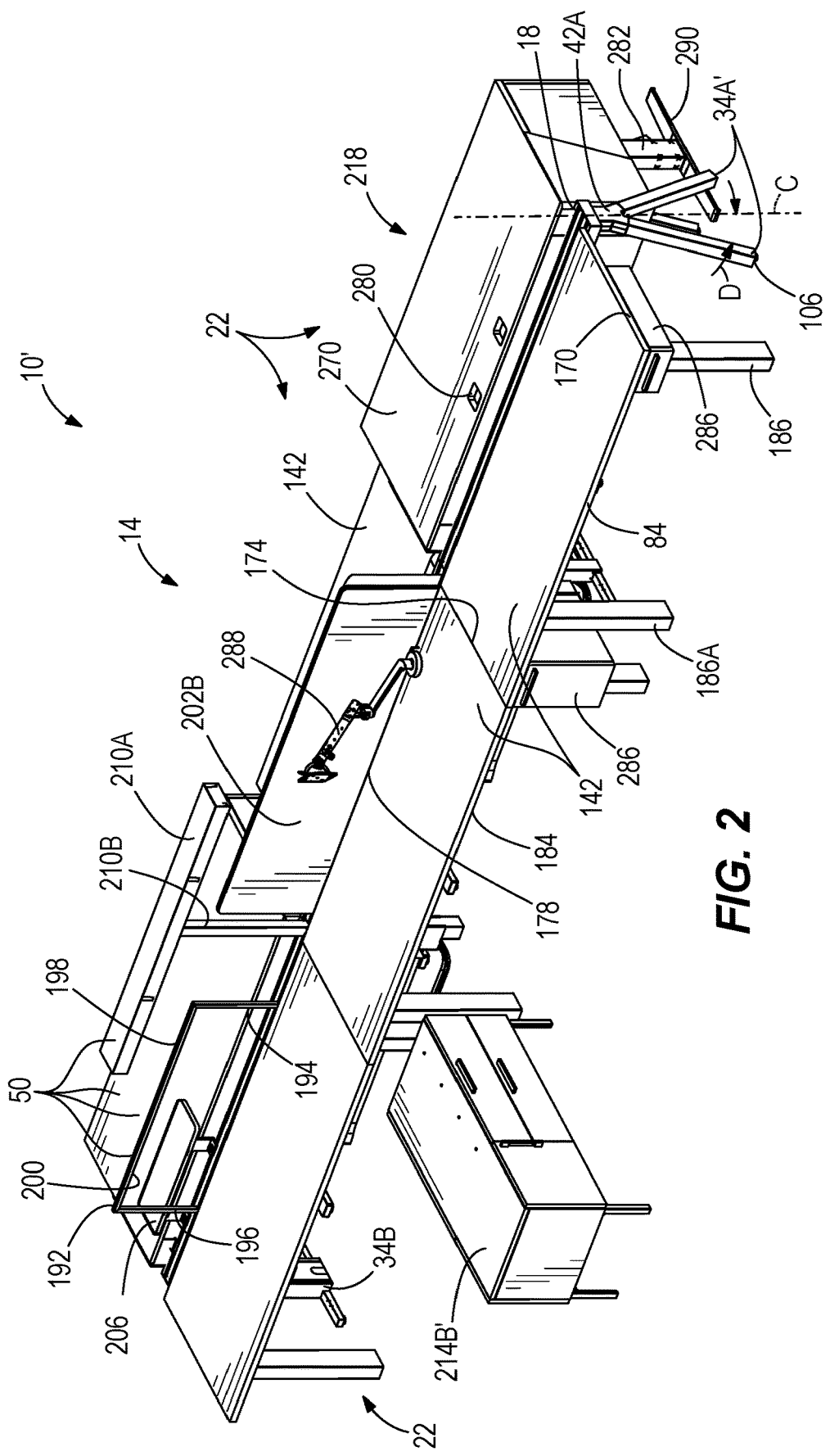
FIG. 2 is a perspective view of the furniture system shown in another configuration.

FIGS. 1 and 2 illustrate furniture systems 10, 10' embodying the invention. The furniture system 10 can be positioned within a building, such as an office, a school, a library, and the like, to provide an adjustable furniture layout 14 for groups of people to work. The furniture system 10 includes one or more elongated chases 18 and a plurality of workstations 22 adjustably coupled to the chases 18.

Figure 3:
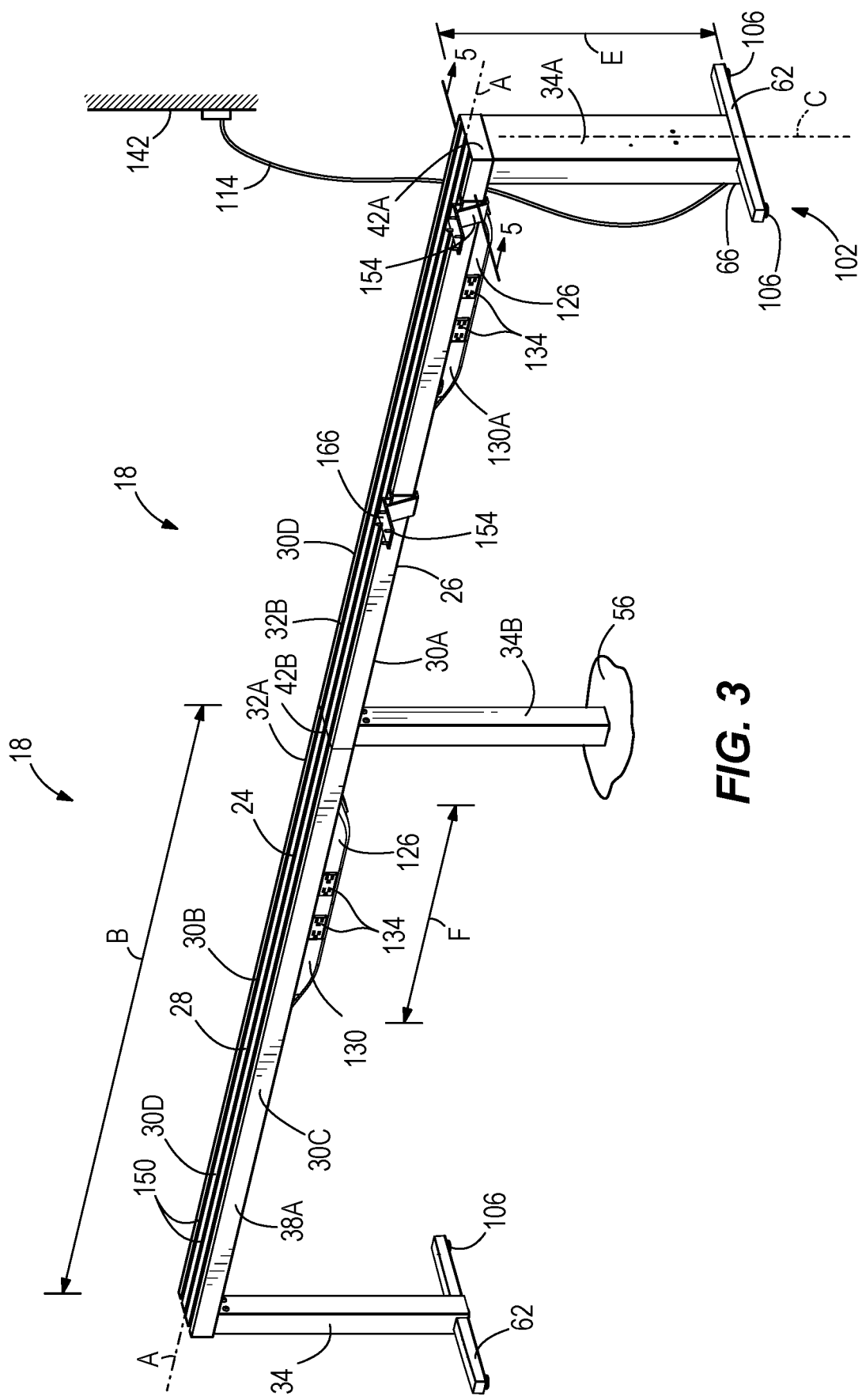
FIG. 3 is a perspective view of two elongated chases of the furniture system.

With reference to FIG. 3, each elongated chase 18 includes a body 24 formed by a plurality of sides 30A-D. In the illustrated embodiment, the body 24 has a generally rectangular cross-sectional shape. In other embodiments, body 24 may have other suitable cross-sectional shapes, such as square, trapezoidal, and the like. The bottom side 30A defines a lower surface 26 of the body 24. The top side 30B is positioned opposite the bottom side 30A and defines an upper surface 28 of the body 24. The other sides 30C, 30D (FIG. 5) are positioned between the bottom and top sides 30A, 30B and extend from a first end 42A to a second end 42B of the body 24. The sides 30C, 30D define first and second side walls 38A, 38B that are coupled to and extend between the lower and upper surfaces 26, 28.

The chase 18 defines a longitudinal axis A (FIG. 3) extending through the first end 42A and the second end 42B. The body 24 of the chase 18 has a length B that is longer than a height and a width of the chase 18 such that the chase 18 is elongated. Specifically, the length B is measured in a direction parallel to the longitudinal axis A. The length B of the chase 18 is several times larger than the height and the width such that the chase 18 resembles a rail or a beam. In some embodiments, a plurality of elongated chases 18 may be coupled together in a line (as shown in FIGS. 1 and 2) such that an overall length of the furniture layout 14 is adjustable to a desired user's needs. The number of chases 18 determines the overall length of the furniture layout 14.

Referring back to FIGS. 1 and 2, the workstations 22 are positioned adjacent the first and second sides 30C, 30D of the chase 18 such that the chase 18 is shared between the workstations 22. In other words, the chase 18 defines a center of the furniture layout 14. Workstation accessories 50, such as tables, screens, and storage units, may be selectively coupled to the chase 18 for forming each workstation 22, as further discussed below.

Figure 6:
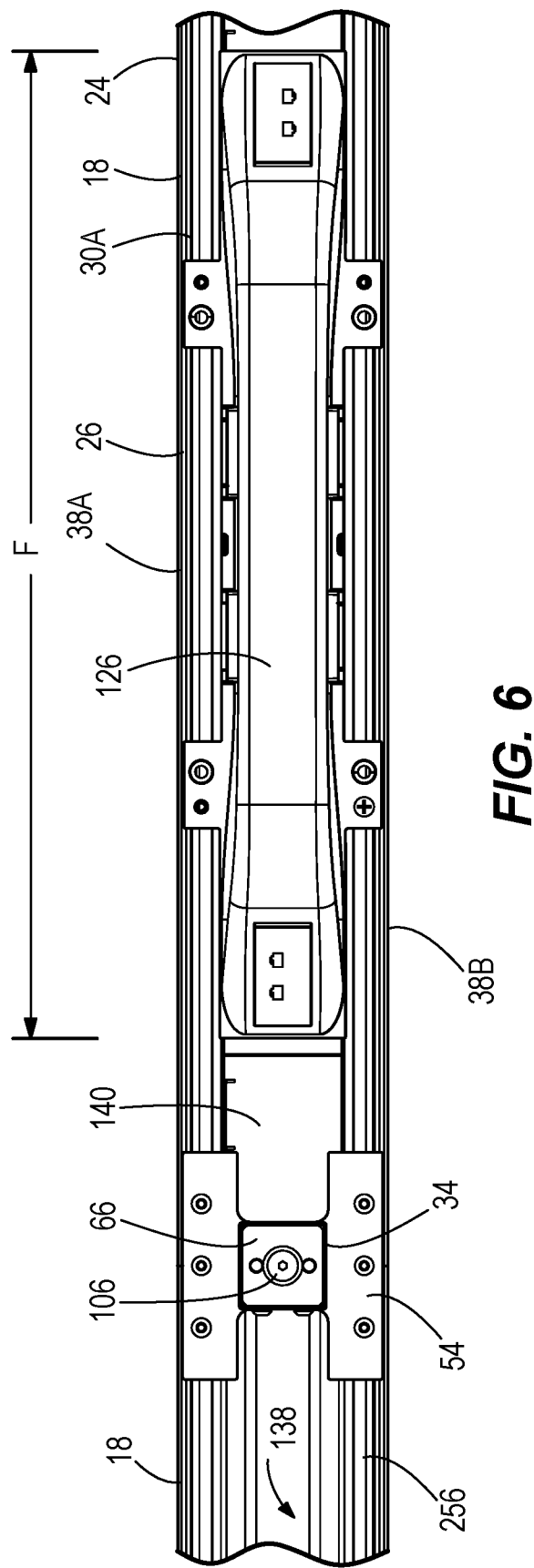
FIG. 6 is a bottom view of a portion of one of the chases of FIG. 3.

With reference to FIG. 3, the chase 18 is supported by legs 34. A first leg 34A is positioned at the first end 42A of the body 24. A second leg 34B is positioned at the second end 42B of the body 24 and spaced apart from the first leg 34A. The first and second legs 34A, 34B are coupled to the lower surface 26 of the body 24. In some embodiments, the chase 18 may include more than two legs 34 positioned along the chase 18 at or between the first and second ends 42A, 42B. The legs 34 are supported on a floor surface 56 of a room. In some scenarios, the legs 34 may be coupled to the lower surface 26 of only one of the chases 18. In other scenarios, the legs 34 may be coupled to the lower surface 26 of two adjacent chases 18. In the illustrated embodiment, the legs 34 are coupled to the lower surface 26 by a bracket 54 (FIG. 6). The bracket 54 may be designed to couple to one of the chases 18 or to span between two adjacent chases 18.

With reference to FIGS. 1-3, each chase 18 includes a vertical axis C (FIGS. 2-3) extending through the lower and upper surfaces 26, 28. The vertical axis C is substantially perpendicular to the longitudinal axis A. The legs 34 may be coupled to the body 24 of the chase 18 parallel to or aligned with the vertical axis C or angled relative to the vertical axis C. For example, as shown in FIGS. 1 and 3, in one configuration the legs 34, 34A, 34B extend parallel to the vertical axis C. As shown in FIG. 2, in other configuration legs 34A' extend at an angle D relative to the vertical axis. In this configuration, two legs 34A' extend in substantially opposite directions from the same end 42A of the body 24, and the angle D is about 45 degrees. In other embodiments, the angle D may be any angle between 1 degree and 89 degrees. In some embodiments, the same type of leg (e.g., the leg 34, the leg 34A, the leg 34B, or the two legs 34A') may be used along the entire length of the chase 18 for a given furniture system. In other embodiments, a mix of different types of legs may be positioned along the length of the chase 18, based on physical space constraints and users' preferences.

With reference to FIGS. 1 and 3, the first leg 34A includes a foot portion 62. The illustrated foot portion 62 is coupled to a bottom end 66 of the first leg 34A. The foot portion 62 extends substantially perpendicular relative to the longitudinal axis A and the vertical axis C. The foot portion 62 is positioned on the floor surface 56. Any or all of the legs 34 of the chase 18 may include the foot portion 62. The foot portion 62 is configured to support and facilitate balancing of the chase 18 and the legs 34.

With continued reference to FIGS. 1-3, the legs 34 support the chase 18 for positioning the chase 18 above the floor surface. Specifically, the chase 18 has a height E determined by a length of the legs 34 such that the chase 18 is spaced a significant distance from the floor surface 56. For example, the height E may be between about two and four feet so that the legs 34 position the body 24 next to a user sitting adjacent the chase 18.

Figure 7:
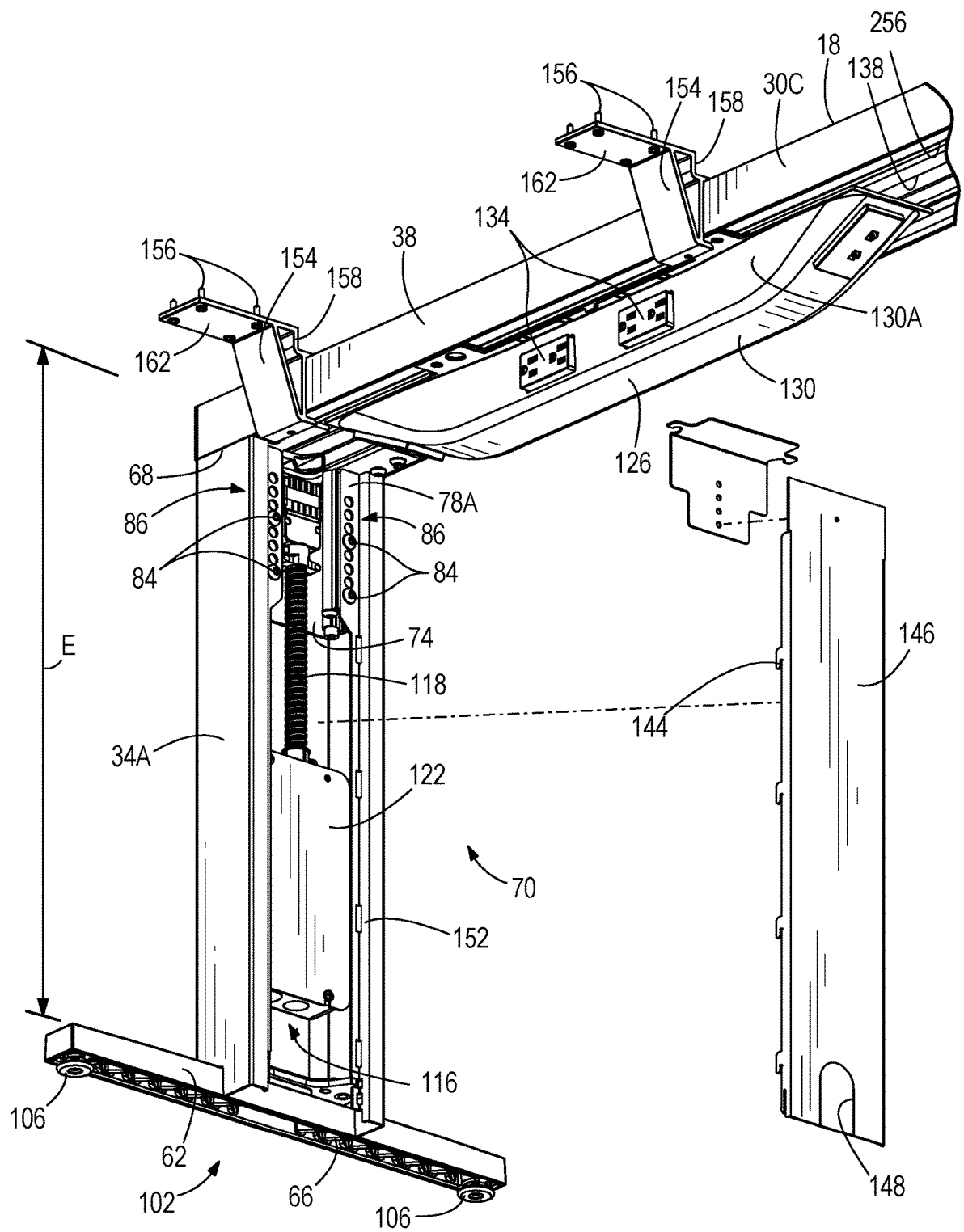
FIG. 7 is a bottom prospective view of a portion of a chase, including a leg coupled to the chase.
Figure 8:
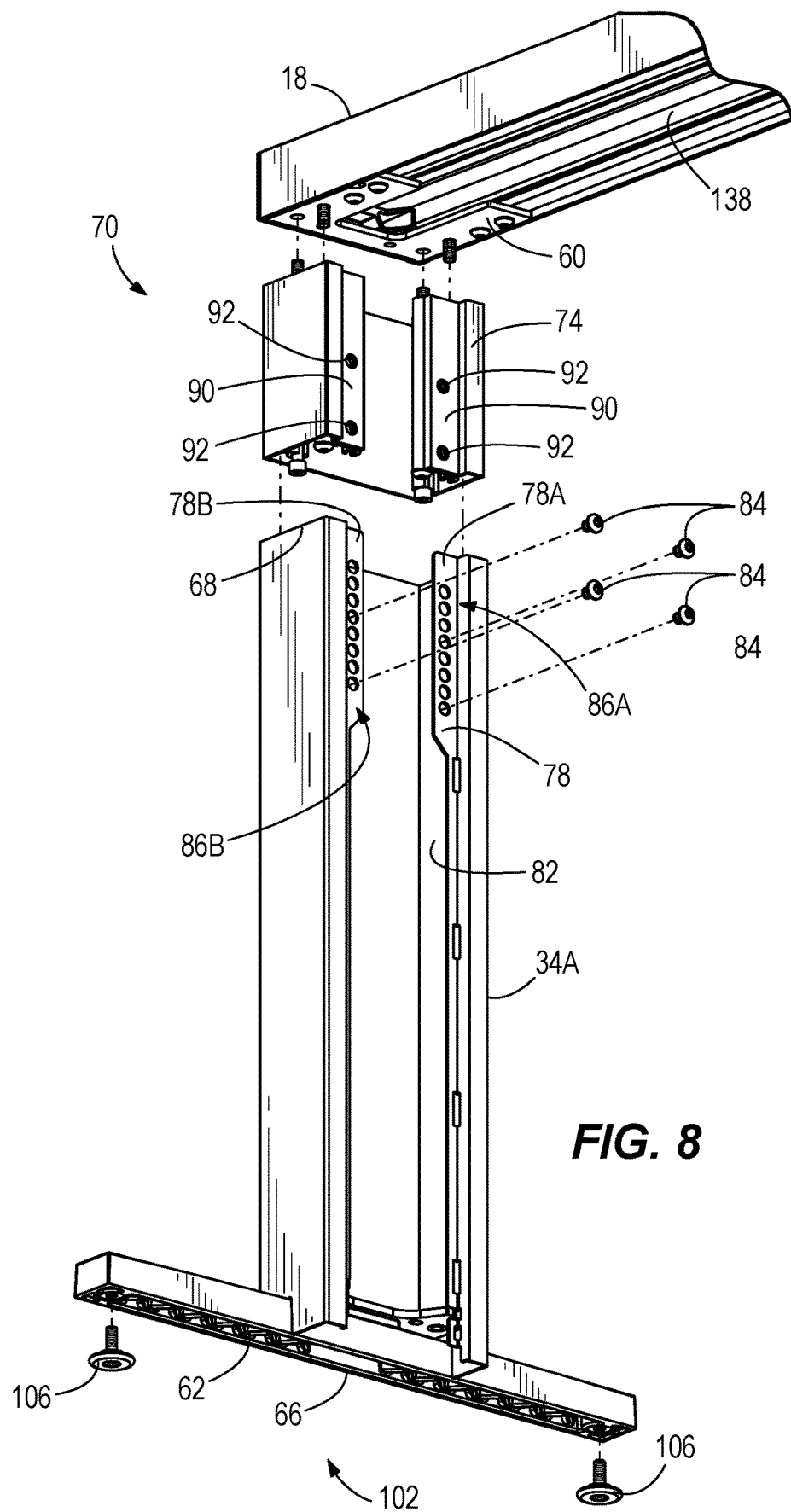
FIG. 8 is an exploded view of a height adjustment mechanism, including the chase and the leg of FIG. 7.

With reference to FIGS. 7 and 8, each leg 34 includes a first height adjustment mechanism 70. The first height adjustment mechanism 70 is a macro height adjustment mechanism. The illustrated height adjustment mechanism 70 is positioned at a top end 68 of each leg 34. The height adjustment mechanism 70 includes an inner leg portion 74 and an outer leg portion 78A, 78B. The outer leg portion 78A, 78B extends from an inner side 82 (FIG. 8) of each leg 34 substantially perpendicular to the vertical axis C. The inner leg portion 74 is telescopably received in the outer leg portion 78A, 78B. In the illustrated embodiment, the inner leg portion 74 is coupled to the lower surface 26 by a bracket 60 such that the height adjustment mechanism 70 is proximate the chase 18. The outer leg portion 78A, 78B includes a plurality of holes 86A, 86B corresponding to holes 92 formed in the inner leg portion 74. The illustrated outer leg portion 78A, 78B includes two flanges extending toward each other to form the outer leg portion 78A, 78B. Each flange 78A, 78B includes a set of holes 86A, 86B, respectively. The illustrated inner leg portion 74 includes two projections 90A, 90B extending towards each other, and positioned adjacent the two flanges of the outer leg portion 78A, 78B. Each projection 90A, 90B includes two holes 92 configured to align with the holes 86A, 86B. Fasteners 84 (e.g., bolts, screws, etc.) are received within the holes 86A, 86B of the outer leg portion 78A, 78B and the holes 92 of each projection 90A, 90B for securing the inner leg portion 74 in a predetermined position to the outer leg portion 78. As such, the height adjustment mechanism 70 is adjustable in discrete intervals. For example, the illustrated holes 86 are spaced apart by about 0.5 inches along the vertical axis C. In other embodiments, the holes 86 may be spaced apart by more or less than 0.5 inches (e.g., 0.4, 1.0, etc.).

The inner leg portion 74 is selectively secured to the outer leg portion 78A, 78B for adjusting the height E of the chase 18 along the vertical axis C. Specifically, the height E of the chase 18 is adjustable by sliding the inner leg portion 74 relative to the vertical axis C (i.e., upwards, downwards) within each leg 34 and inserting the fasteners 84 through the aligned holes 86, 92. Sliding the inner leg portion 74 upwards along the vertical axis C increases the height E of the chase 18, and sliding the inner leg portion 74 downwards decreases the height E. The height adjustment mechanism 70 is positioned at the top end 68 such that the inner leg portion 74 may extend out or telescope from the top end 68 of each leg 34 when increasing the height E.

With reference to FIG. 7, each leg 34 also includes a second height adjustment mechanism 102. The second height adjustment mechanism 102 is a micro height adjustment mechanism. The illustrated height adjustment mechanism 102 is positioned at the bottom end 66 of each leg 34 proximate the floor surface 56. The height adjustment mechanism 102 includes glides 106. Each of the illustrated glides has a generally cylindrical shape and is threadably coupled to each leg 34. With respect to the first construction of the legs 34 (FIGS. 1 and 3), the glides 106 are rotatably coupled to the bottom end 66 of the leg 34 or to the foot portions 62. With respect to the second configuration of the legs 34' (FIG. 2), the glides 106 are rotatably coupled to the bottom end 66 of each angled leg 34'.

Rotation of the glides 106 adjusts the height E of each leg 34. Specifically, rotation in one direction increases a length of the glides 106 relative to the vertical direction C, and rotation in the opposite direction decreases the length of the glides 106. As such, the second height adjustment mechanism 102 is infinitely adjustable compared to the discrete adjustments of the first height adjustment mechanism 70. The legs 34 may include one or both of the height adjustment mechanisms 70, 102 adapted for adjustment of the height E of the chase 18 relative to the vertical axis C.

The illustrated height adjustment mechanism 70 is configured as a macro height adjustment mechanism in which the height E is adjusted in in relatively large increments. Conversely, the illustrated height adjustment mechanism 102 is configured as a micro height adjustment mechanism in which the height E is adjusted in relatively small increments compared to the macro height adjustment mechanism 70. Furthermore, the macro height adjustment mechanism 70 may be used by an installer when assembling the furniture system 10, and the micro height adjustment mechanism 102 may be used by a user of one of the workstations 22.

Figure 11:
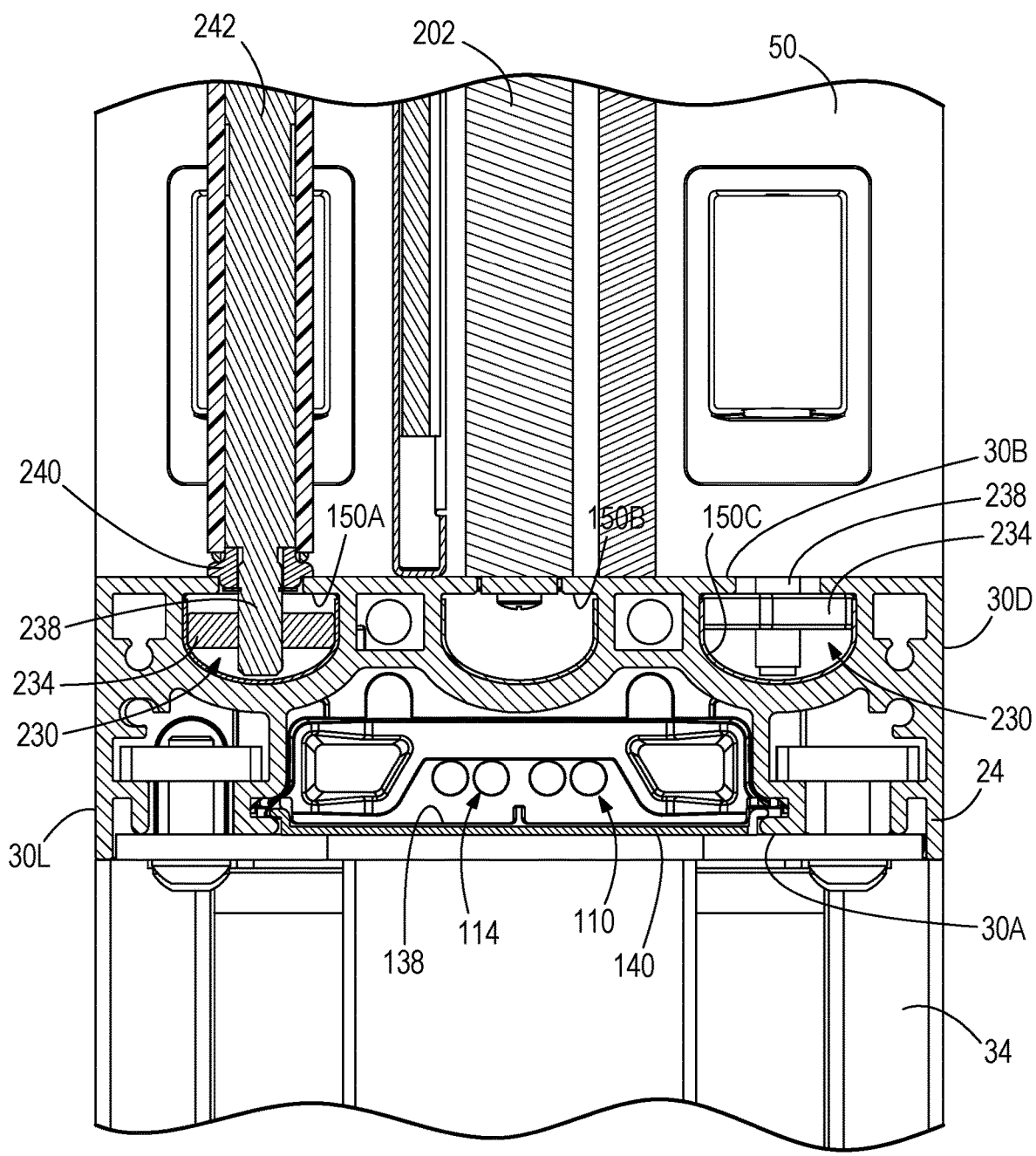
FIG. 11 is a cross-sectional view of the chase taken along line 11-11 in FIG. 10.

With reference to FIG. 11, the body 24 of the chase 18 includes a cavity 110 extending from the first end 42A to the second end 42B along the longitudinal axis A. The cavity 110 is continuous and extends the length B of the chase 18. The cavity 110 is configured to receive power cables 114 (e.g., electrical cables) (FIG. 11). The cavity 110 may also or alternatively receive data cables within the cavity 110. The power cables 114 may extend the whole length B (i.e., from the first end 42A to the second end 42B) or portions of the length B of the body 24.

With reference to FIGS. 3 and 7, each leg 34 includes a channel 116. The power cables 114 also extend through the channel 116 of at least one of the legs 34 (e.g., the first leg 34A in FIG. 3) of the chase 18. Specifically, the power cables 114 extend through the channel 116 into the cavity 110 of the body 24. The illustrated leg 34A includes the inner leg portion 74 having a first, flexible member 118 (FIG. 7) within the inner leg portion 74, and a second member 122 positioned at an end of the first member 118. The illustrated first member 118 is formed from a flexible conduit. The illustrated second member 122 is a junction box. The inner leg portion 74, the first member 118, and the second member 122 are positioned within the channel 116 of each leg 34. The illustrated power cables 114 are configured to extend from a building (e.g., a wall 124 as shown in FIG. 3, floor, other furniture system, etc.) through the second member 122, the first member 118, and the inner leg portion 74 within the leg 34, and into the cavity 110 of the body 24.

With reference to FIGS. 3, 7, and 8, the first member 118 is coupled to the inner leg portion 74 of the height adjustment mechanism 70. The first member 118 is configured to guide the power cables 114 through the leg 34 to the cavity 110 of the body 24. Furthermore, a length of the first member 118 is determined by the installer such that the first member 118 is adapted to move with the movement of the inner leg portion 74 when adjusting the height E of the chase 18. As such, the power cables 114 may be positioned within any of the legs 34, while the height E of the chase 18 may be adjusted using the height adjustment mechanism 70 within the legs 34. In other embodiments, the first member 118 may not be provided such that the power cables 114 are configured to slide within each leg 34 with the movement of the height adjustment mechanism 70.

With reference to FIG. 7, the illustrated leg 34A further includes a cover member 146 removably coupled to the leg 34A. The illustrated cover member 146 has a rectangular shape. In other embodiments, the cover member 146 may have other shapes such as square, circular, and the like. The cover member 146 is positioned a side of the first leg 34A facing the second leg 34B. The illustrated cover member 146 includes hook shape projections 144 received in notches 152 of the leg 34A for removably coupling the cover member to the leg 34A without the use of tools. In other embodiments, the cover member 146 may be removably coupled to each leg 34 by fasteners. In addition, the cover member 146 includes a window 148 positioned adjacent the bottom end 66 of the leg 34. The window 148 is configured to receive the power cables 114 extending from a part of the building (e.g., the wall 124) into one of the legs 34 (e.g., the first leg 34A). The cover member 146 is configured to provide access to the channel 116. The cover member 146 may cover or conceal the first height adjustment mechanism 70 and/or the power cables 114 within each of the legs 34.

The power cables 114 are configured to connect to a building's power supply. The connection is a hardwire connection (i.e., a relatively permanent connection) to the building's power supply. In addition, the power cables 114 are configured to provide electrical power directly from the building such that the power supplied may be larger than 120 volts. As such, the furniture system 10 is configured to provide and support relatively large amounts of power to the workstations 22 using the chase 18. The chase 18 may further include the data cables within the cavity 110 such that data can be supplied to each of the workstations 22. As such, the furniture system 10 may be configured as an architectural subsystem of the building.

As shown in FIG. 3, the chase 18 includes a plurality of modular power units 126. The illustrated modular power units 126 are coupled to and extend from the lower surface 26 of the body 24. Each modular power unit 126 includes outer faces 130 and power outlets 134 supported by the outer faces 130. Although only one side of the illustrated modular power units 126 are shown, the other side is substantially the same in which each of the illustrated modular power units 126 include four power outlets 134, two power outlets 134 supported on the outer face 130 of each side. In other embodiments, each modular power unit 126 may include one or more power outlets 134 in which the two sides of each modular power unit 126 may have the same or a different number of power outlets 134 supported by each of the outer faces 130. For example, one of the sides of the modular power unit 126 may have one power outlet 134 supported by one of the outer faces 130, and the opposite side may have no power outlets 134.

The modular power units 126 are couplable at different locations along the length B of the body 24 such that the power and/or data may be supplied at any position along the length B. As such, power and/or data distribution is adjustable by coupling the modular power units 126 at selective positions underneath the chase 18. The installer may couple the modular power units 126 at the selected positions when assembling the furniture system 10.

With reference to FIGS. 6 and 7, the power outlets 134 are supported by the chase 18. The power outlets 134 are electrically coupled to the power cables 114. Specifically, the power cables 114 extend from the cavity 110 (FIG. 5) through an opening 138 (FIG. 6) in the lower surface 26 of the body 24, and into each of the modular power units 126 extending below the lower surface 26 for connecting to the power outlets 134. As such, the modular power units 126 enclose the opening 138 where power distribution will be supplied.

With reference to FIGS. 6 and 11, the chase 18 includes a cover plate 140. The illustrated cover plate 140 is coupled to the lower surface 26 of the body 24 where the modular power units 126 are not provided. Specifically, the cover plate 140 is configured to position over the opening 138 in order to close a portion of the cavity 110. The cover plate 140 is further configured to conceal the power cables 114 within the cavity 110. In addition, each of the modular power units 126 has a length F measured in a direction parallel to the longitudinal axis A. The length F is less than the length B (FIG. 3) of the body 24. In the illustrated embodiment, the length F of each modular power unit 126 is about one third of the length B of the body 24. In other embodiments, the length F of each modular power unit 126 may be between about 5% and about 50% of the length B of the body 24.

With reference to FIGS. 3 and 6, the modular power units 126 are coupled to the bottom side 30A of the body 24. Specifically, the modular power units 126 are coupled such that the first and second outer faces 130A, 130B are spaced inwardly from the first and second side walls 38A, 38B of the sides 30C, 30D (FIG. 6). In other words, the modular power units 126 are recessed under the chase 18. The modular power units 126 are configured to provide power at each of the first and second sides 30C, 30D of the chase 18. The recessed modular power units 126 may inhibit interference of plugs and power cords plugged into the power outlets 134 adjacent the workstation accessories 50, such as tables 142. The recessed modular power units 126 may further reduce visualization of the power outlets 134 until the user is seated at the workstation 22.

Figure 5:
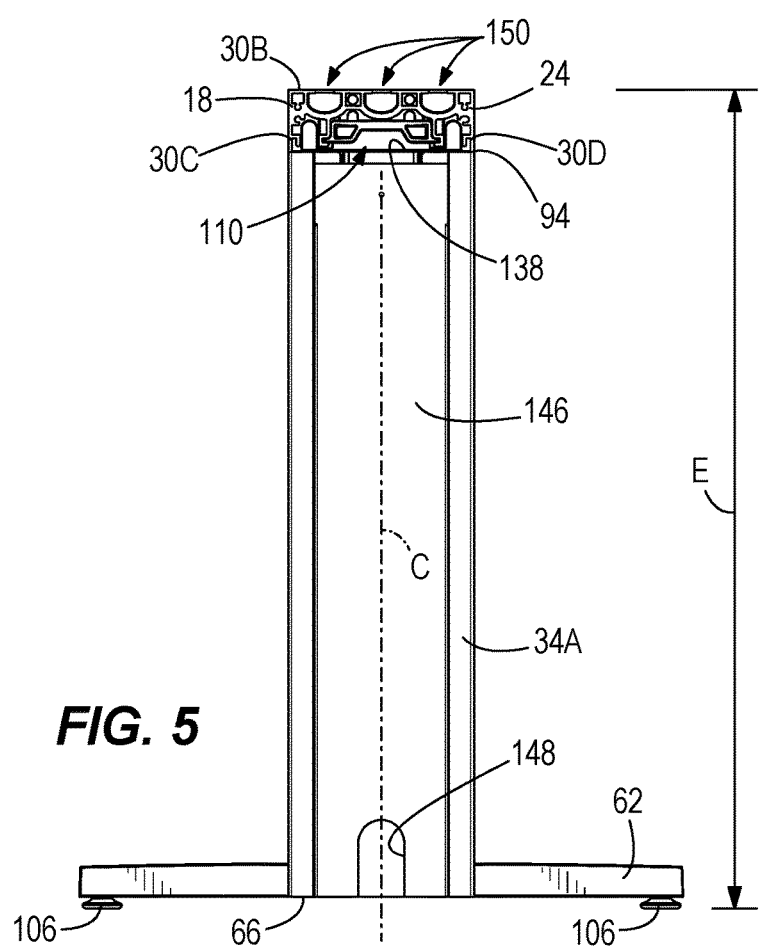
FIG. 5 is a cross-sectional view of one of the chases taken along line 5-5 in FIG. 3.

With reference to FIGS. 3 and 5, the upper surface 28 of the body 24 defines a plurality of slots 150A-C. The slots 150A-C extend between the first end 42A and the second end 42B, and are continuous from the first end 42A to the second end 42B. The illustrated body 24 includes three slots 150A-C. In other embodiments, the body 24 may have fewer or more slots 150A-C. Each slot 150A-C is defined by a generally C-shaped wall in cross-section such that each slot 150A-C has a relatively narrow opening accessible through the upper surface 28 and a relatively large opening under the upper surface 28. In other embodiments, the cross-section of the slots 150A-C may have other shapes. The slots 150A-C extend from the top side 30B of the chase 18 into the body 24. The slots 150A-C are positioned above the cavity 110 (FIG. 5). The slots 150A-C are also separate, or isolated, from the cavity 110. The slots 150A-C are configured to selectively couple to the workstation accessories 50 (e.g., the tables 142) to support the workstation accessories 50 on the chase 18, as further described below.

Figure 9:
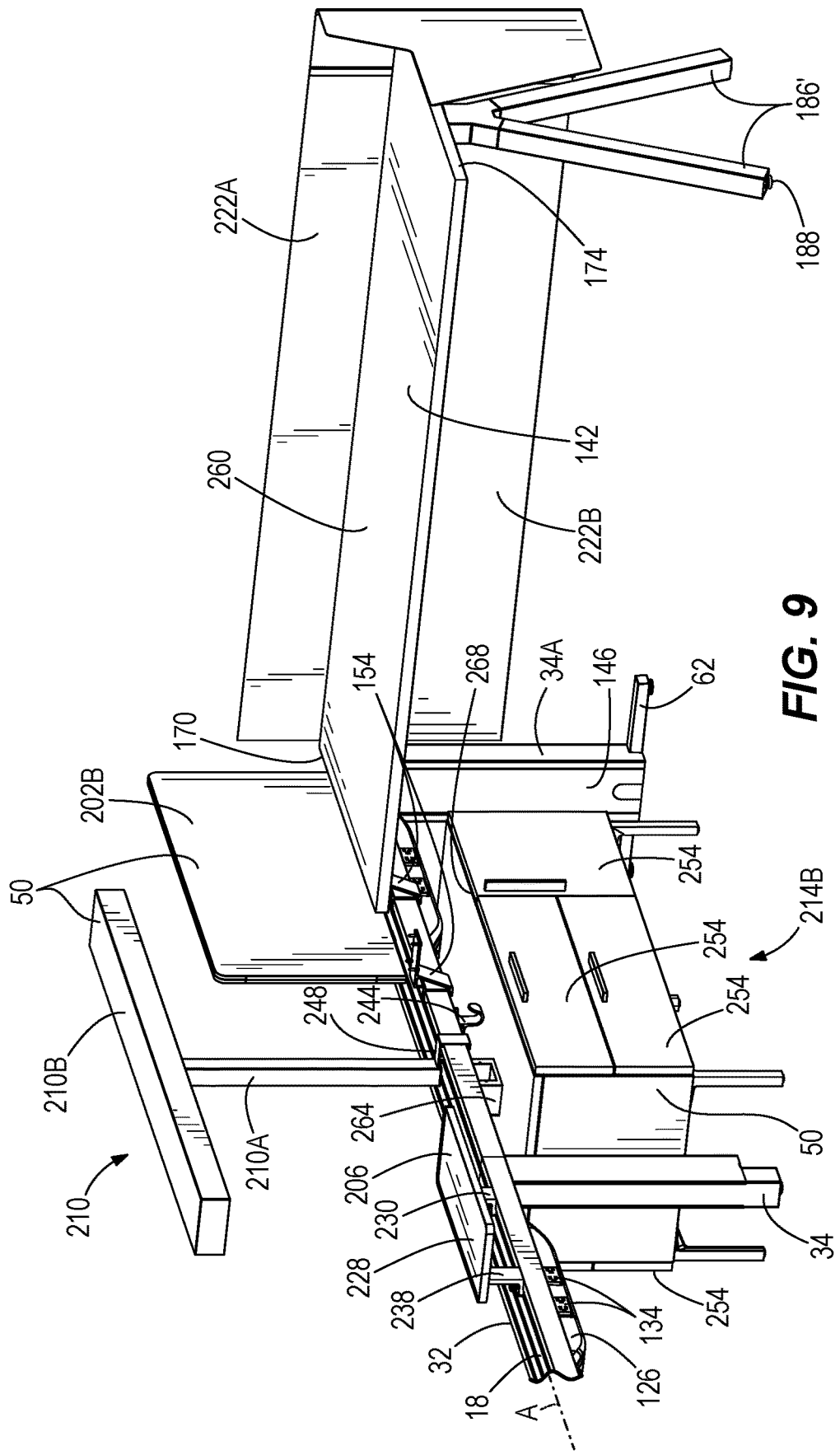
FIG. 9 is a perspective view of a portion of the furniture system in still another configuration including different furniture items.

With reference to FIGS. 7 and 9, the tables 142 are coupled to the upper surface 28. In the illustrated embodiment, the tables 142 are coupled to the upper surface 28 using connection members 154 (e.g., brackets) partially positioned within the slots 150. Each connection member 154 includes a coupling portion 158 and an extension portion 162 extending from the coupling portion 158 (FIG. 7). The illustrated coupling portion 158 includes upper and lower portions for coupling to the upper and lower surfaces 28, 26, respectively of the body 24. Specifically, the upper portion of the coupling portion 158 is received within either the first slot 150A or the third slot 150C, and the lower portion is received in a slot 256 defined by the lower surface. The extension portion 162 forms a platform for coupling to each table 142. The illustrated extension portion 162 is coupled to one of the tables 142 using fasteners 156 (e.g., screws, bolts, etc.). Two or more connection members 154 may be used to couple each table 142 to the chase 18. In other embodiments, any number of connection members 154 may be used (e.g., one, three, four, etc.). Each table 142 has at least one of the connection members 154 received in the slots 150A, 150C for connecting each table 142 to the chase 18. In addition, the connection members 154 may be received at any position along the length B of the chase 18 such that the position of the tables 142 along the chase 18 is adjustable.

Figure 4:
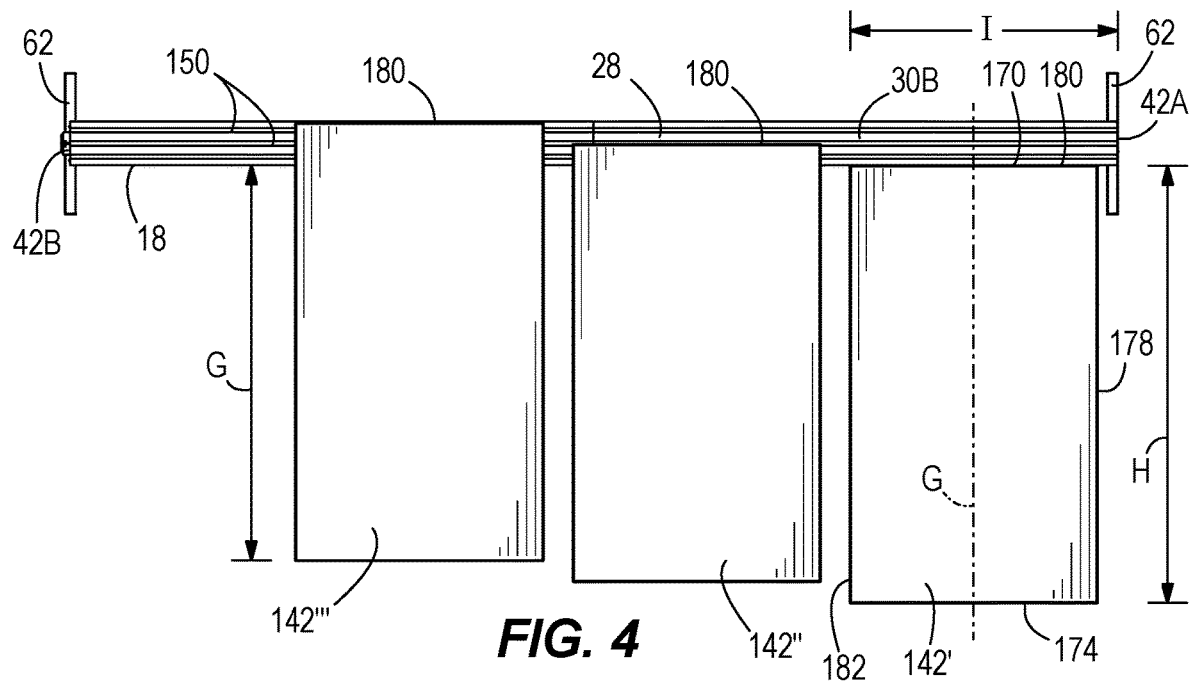
FIG. 4 is a top view of the two chases of FIG. 3, including tables coupled to the chases.

With reference to FIGS. 3, 4, and 7, the extension portion 162 includes a flat surface 166. The illustrated flat surface 166 is positioned adjacent a bottom surface 168 (FIG. 14) of the table 142. The fasteners 156 extend through the extension portion 162 and the bottom surface 168 into the table 142. As such, the extension portion 162 and the fasteners 156 are positioned underneath the table 142. Furthermore, as shown in FIG. 4, each table 142 includes a first end 170, a second end 174, a first side 178, and a second side 182. The first and second sides 178, 182 extend between the first and second ends 170, 174. The fasteners 156 may be positioned proximate any end 170, 174 or side 178, 182. For example, as shown in FIG. 1, the fasteners 156 are positioned proximate the first end 170. As shown in FIG. 2, the fasteners 156 are positioned proximate the first side 178. The tables 142 are coupled to the upper surface 28 of the chase 18 using the connection members 154 and slots 150A-C. The tables 142 extend outwardly away from the chase 18.

With reference to FIG. 4, each table 142 includes a longitudinal axis G extending through the first end 170 and the second end 174. The tables 142 include a length H measured along the longitudinal axis G and a width I measured perpendicular to the length H. The illustrated width I is less than the length H. The tables 142 may be positioned in a first configuration, as shown in FIG. 1, in which the longitudinal axis G of each table 142 is substantially perpendicular to the longitudinal axis A of the chase 18. The tables 142 may alternatively be positioned in a second configuration, as shown in FIG. 2, in which the longitudinal axis G of each table 142 is substantially parallel to the longitudinal axis A. As such, the tables 142 are mountable to the chase 18 in different positions relative to the chase 18 such that the longitudinal axis G is either perpendicular to or parallel to the longitudinal axis A of the chase 18. In other embodiments, a combination of the configurations may be used in the furniture layout 14.

With continued reference to FIG. 4, the tables 142 are mountable to the body 24 such that each table 142 extends outwardly beyond one of the sides 30C, 30D of the chase 18. Specifically, each table 142 includes an edge 180 (e.g., the first end 170 or the first side 178) positioned proximate the body 24. The edge 180 may be vertically aligned with the side wall 38A on the first side 30C (see table 142'), vertically aligned with the side wall 38B on the second side 30D (see table 142'''), or located intermediate the side walls 38A, 38B of the chase 18 (see table 142''). The fasteners 156 of the connection member 154 may be positioned closer to or farther from the edge 180 for adjusting the position of the edge 180 relative to the body 24. For example, when the fasteners 156 are positioned relatively close to the first end 170, the first end 170 is adjacent the side wall 38A, and the table 142 extends outwardly beyond the first side 30C. The position of each table 142 proximate the sidewall 38A, 38B of the body 24 adjusts the amount of exposure of the top surface 28 of the chase 18. The top surface 28 may be partially or completely covered between the first and second sides 30C, 30D by the tables 142, and any or all of the slots 150A-C may be at least partially covered by the tables 142.

With reference to FIGS. 1-3, two or more chases 18 may be positioned adjacent each other for forming the furniture layout 14. The adjacent chases 18 define the longitudinal axis A. One of the tables 142 may be coupled to both of the adjacent chases 18. For example, the table 142 may have one connection member 154 received within the first slot 150A of one of the chases 18, and another connection member 154 received within the first slot 150A of the adjacent chase 18.

In some embodiments, the furniture layout 14 may include two or more chases 18 extending parallel to, but spaced from each other. Each chase 18 may further include the tables 142 in which at least some of the tables 142 are positioned on the side 30C of the first chase 18, and some of the table 142 are positioned on the side 30D of the second chase 18. The tables 142 extend outwardly from their respective chases 18 toward each other such that a space is defined between the tables 142. The space may form a walkway between two furniture systems. Adjusting the position of the edge 180 of the tables 142 proximate the sidewalls 38A, 38B of each chase 18 allows adjust a width of the walkway between the tables 142 to be changed without moving the chases 18.

With reference to FIGS. 1 and 2, each of the tables 142 includes a plurality of leg members 186A, 186B. The illustrated leg members 186A, 186B are coupled to the bottom surface 168 of the tables 142 at positions spaced from the chase 18. For example, as shown in FIG. 1, the legs members 186A, 186B are spaced from the chase 18 along the longitudinal axis G (FIG. 4) such that the leg members 186A, 186B are positioned proximate the second end 174 of the table 142. In some embodiments, some of the tables 142 include only one leg member 186A, 186B such that the leg member 186A, 186B and the chase 18 are configured to support each of the tables 142. In other embodiments, the tables 142 include at least two leg members 186A, 186B (FIG. 2).

Similar to the legs 34 of the chase 18, the tables 142 may include a first type of leg member 186A (FIG. 2) that is parallel to the vertical axis C of the chase 18, or a second type of leg member 186B (FIG. 1) that is angled relative to the vertical axis C of the chase 18. The second type of leg members 186B include two legs members 186B angled at about 45 degrees relative to the vertical axis C. In other embodiments, the angle may be any angle between 1 degree and 89 degrees. The leg members 186A, 186B may include one or more height adjustment mechanisms such that the leg members 186A, 186B are operable to extend and retract relative to the bottom surface 168 of each table 142. The height adjustment mechanism(s) may be similar to the height adjustment mechanisms 70, 102 of the legs 34. For example, as shown in FIG. 9, the leg members 186B include glides 188 similar to the glides 106 of the height adjustment mechanism 102. As such, the height of the tables 142 may be adjusted to a similar height E of the chase 18. The leg members 186A, 186B may further include foot portions, similar to the foot portions 62 of the legs 34.

The tables 142 may also be configured as fixed height surfaces. In this embodiment, the leg members 186A, 186B do not include height adjustment mechanisms. Furthermore, in other embodiments, the leg members 186A, 186B support and facilitate balancing of the chase 18 and the legs 34 without the need of foot portions. Omitting the foot portions provides a cleaner aesthetic for the furniture system and minimizes obstruction of the foot portions 62 in a foot space positioned under the tables 142 of the workstations 22.

Figure 10:
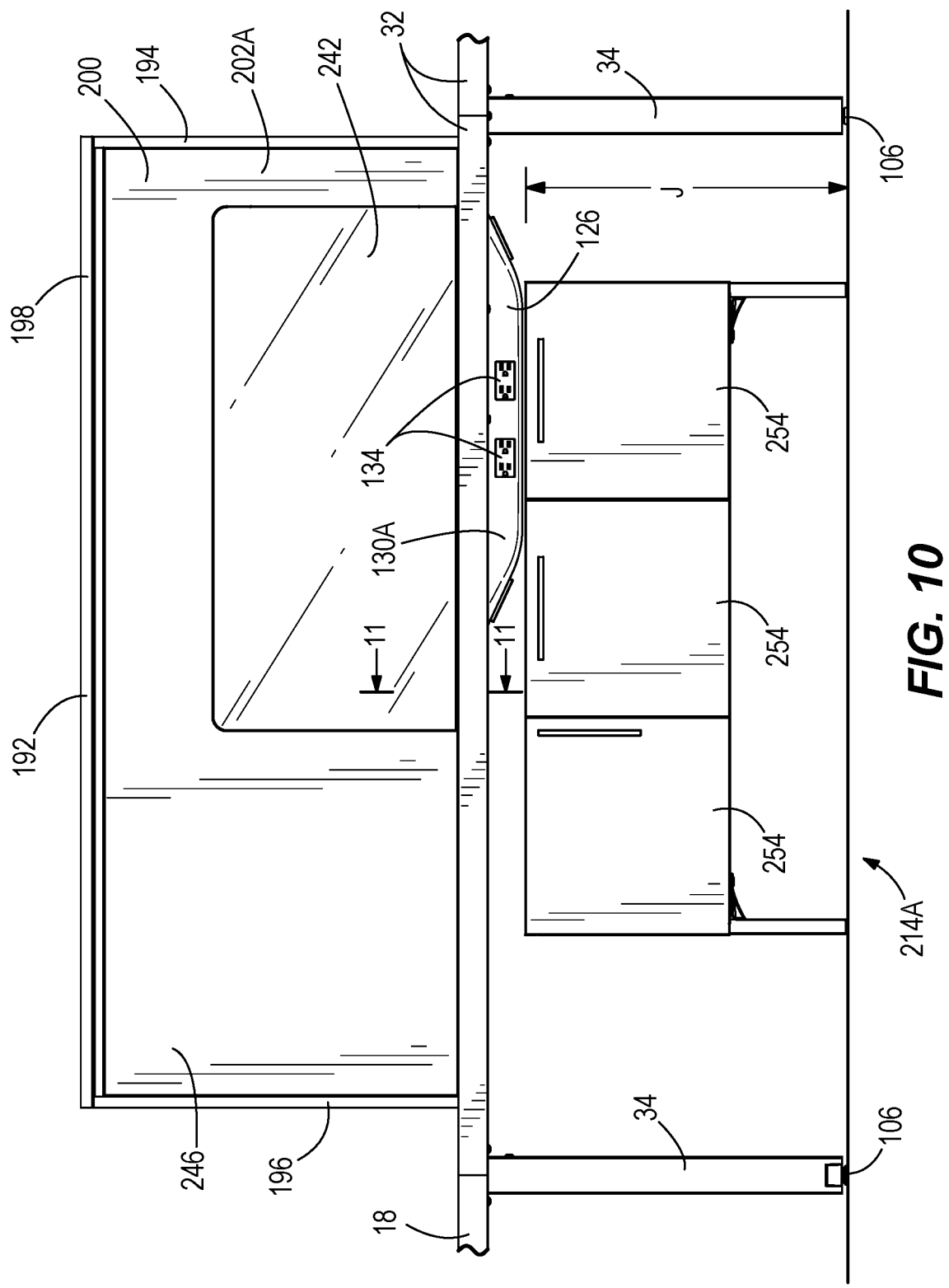
FIG. 10 is a front view of a portion of the furniture system in yet still another configuration.

With reference to FIGS. 9 and 10, the workstation accessories 50 include the tables 142 and furniture items 190. The furniture items 190 may include a frame 192, a screen 202, a shelf 206, a light 210, a storage unit 214, a desk 218, a privacy screen 222A, a modesty screen 222B, a board member 242, a hook 244, a cable management member 248. Other types of furniture items, such as a USB power puck, may also be included. The tables 142 and the furniture items 190 can be positioned within any of the workstations 22 to individualize and enhance usability of the workstations 22. The furniture items 190 may be supported by the chase 18 to increase the functionality of the chase 18.

With reference to FIGS. 9-11, the furniture items 190 are coupled to the upper surface 28 of the chase 18. In the illustrated embodiment, the furniture items 190 are coupled to the upper surface 28 by support members 230. An example of one of the support members 230 is shown in FIG. 11. The support member 230 is received within one of the slots 150A. The illustrated support member 230 has a T-shape and includes a first support portion 234 and a second support portion 238. The first support portion 234 is received in the slot 150A and has a shape corresponding to the slot 150A to inhibit movement out of the slot 150A. The second support portion 238 extends through the first support portion 234 and above the top surface 28 of the chase 18. The second support portion 238 provides a surface for attachment of the furniture items 190 to the support member 230. A fastener 240, such as a nut, is positioned on the second support portion 238 for securing the support member 230 to one of the slots 150A-C. The fastener 240 is rotatably adjustable on the second support portion 238 for adjustably tightening the support member 230. Some of the furniture items 190 such as the hook 244, the cable management member 248, and the power member may be coupled to the lower surface 26 of the chase 18 rather than the upper surface 28. These furniture items 190 are coupled to the slot 256 defined in the lower surface 26 using similar support members or other suitable support members.

With reference to FIGS. 2 and 11, the tables 142 and the furniture items 190 may be coupled to any one of the slots 150A-C at any position along the length B of the chase 18 such that the tables 142 and the furniture items 190 overlap each other at the same position along the length B of the chase 18. For example, as shown in FIG. 2, the frame 192 is coupled to one of the slots 150A and the shelf 206 is coupled to another one of the slots 150C adjacent the frame 192 and proximate the same position along the length B of the chase 18 such that portions of the frame 198 and shelf 206 overlap. In another example, as shown in FIGS. 10 and 11, the board member 242 is positioned in one of the slots 150A proximate the first side 30C of the chase 18, a portion of the screen 202 is adjacent the board member 242 and positioned over the second one of the slots 150B, and another workstation accessory 50 is positioned in the third one of the slots 150C.

With reference to FIGS. 1, 2, 9, and 10, the illustrated frame 192 has a generally rectangular shape. In other embodiments, the frame 192 may have a square shape. Specifically, the frame 192 includes a first member 194 extending perpendicularly from the upper surface 28, a second member 196 spaced apart from the first member 194 and extending perpendicularly from the upper surface 28, and a third member 198 connecting the first and second members 194, 196. The third member 198 extends parallel to the upper surface 28. An opening 200 is defined between the first, second, and third members 194, 196, 198 such that the frame 192 is configured as an open frame (the screen 202A overlaps the opening 200 in FIG. 10). The open frame 192 creates an implied boundary between two workstations 22 on opposing sides of the chase 18, without creating a physical barrier between the workstations 22 that blocks a user's view. The position of the frame 192 on the chase 18 is adjustable by the installer and/or any of the users of the workstations 22.

With continued reference to FIGS. 1, 2, 9, and 10, the screen 202A-C has a body 204. The illustrated body 204 has a generally rectangular shape. In other embodiments, the body 204 may have and other shape such as square, circular or semi-circular, oblong, and the like. The body 204 is formed of a material such as fabric, plastic, metal, and the like. The screen 202A-C may or may not be transparent. The screen 202A-C may further be flexible or rigid. Furthermore, the illustrated screen 202A-C is configured in at least two configurations. In one configuration, the screen 202A (FIG. 1) is be positioned within the frame 192 and supported by the frame 192. In other configurations, the screen 202B (FIG. 9) includes substantially straight edges. The edges may alternatively be curved or wavy.

With reference to FIGS. 1, 10 and 11, the furniture item 190 includes the board member 242 (e.g., dry-erase white board, push pin bulletin board, a magnetic or metallic sheet, etc.). In some embodiments, the board member 242 is positioned within the frame 192 such that the board member 242 forms a barrier similar to the screen 202 (FIG. 1). The illustrated board member 242 is coupled to the upper surface 28 of the chase 18 using the support member 230 received within one of the slots 150A-C (FIG. 11). In other embodiments, the board member 242 may be coupled to a front surface 246 of the screen 202 or to the frame 192. The board member 242 is configured to provide a surface to be written on, to receive push pins, to support magnets, or to otherwise be customized by a user.

With reference to FIG. 9, the light 210 is coupled to the upper surface 28 of the chase 18. The illustrated light 210 includes a first portion 210A extending substantially perpendicular to the longitudinal axis A, and a second portion 210B extending parallel along the longitudinal axis A. In some embodiments, the light 210 is electrically connected to one of the power outlets 134 of the chase 18 by a power cord. In this embodiment, the cable management member 248 is configured to cover the power cord that are extending from a bottom of the light 210 to the power outlet 134. In other embodiments, the light 210 is powered from a rechargeable power source (e.g., battery).

Figure 13:
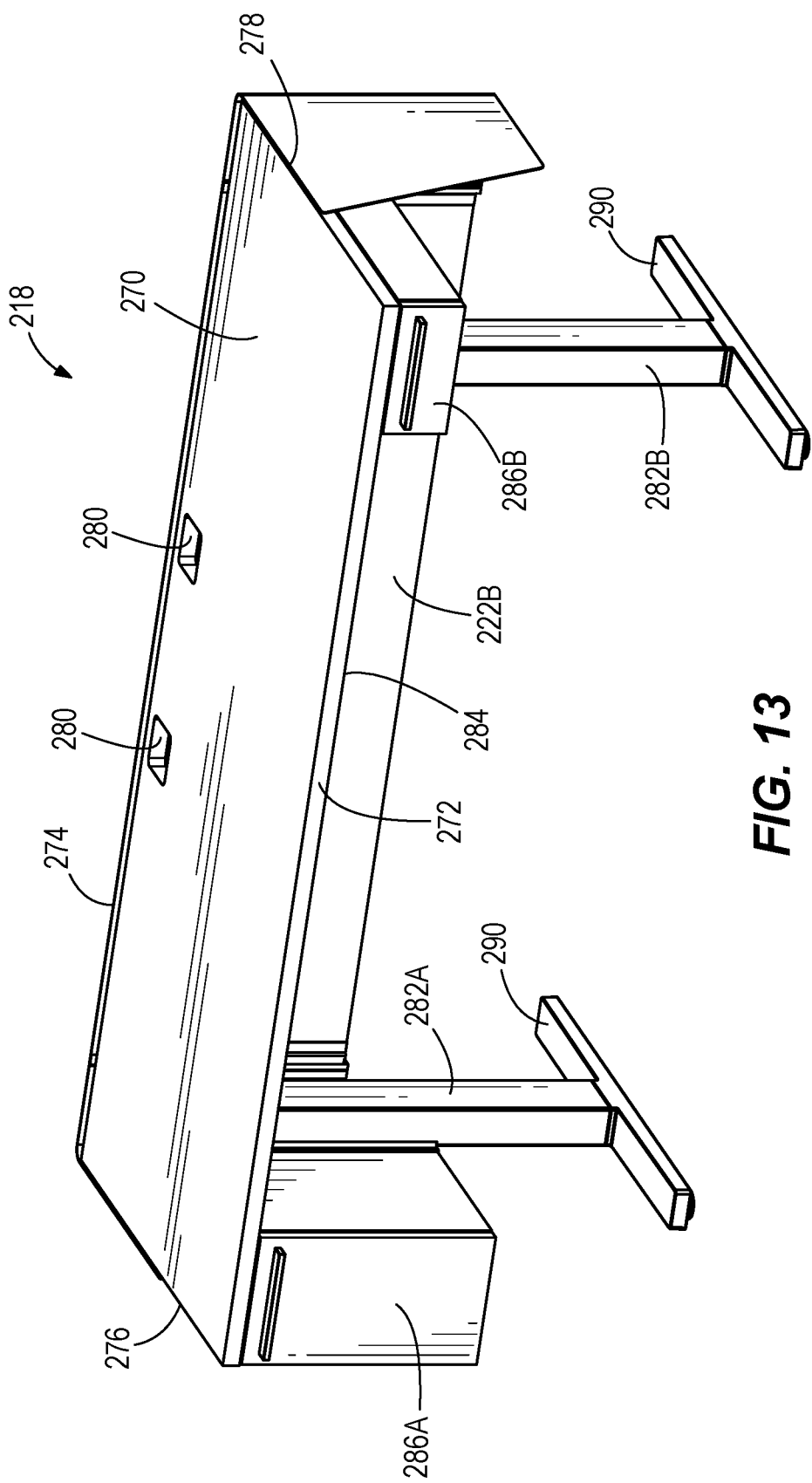
FIG. 13 is a perspective view of a height-adjustable desk for use with the furniture system.
Figure 14:
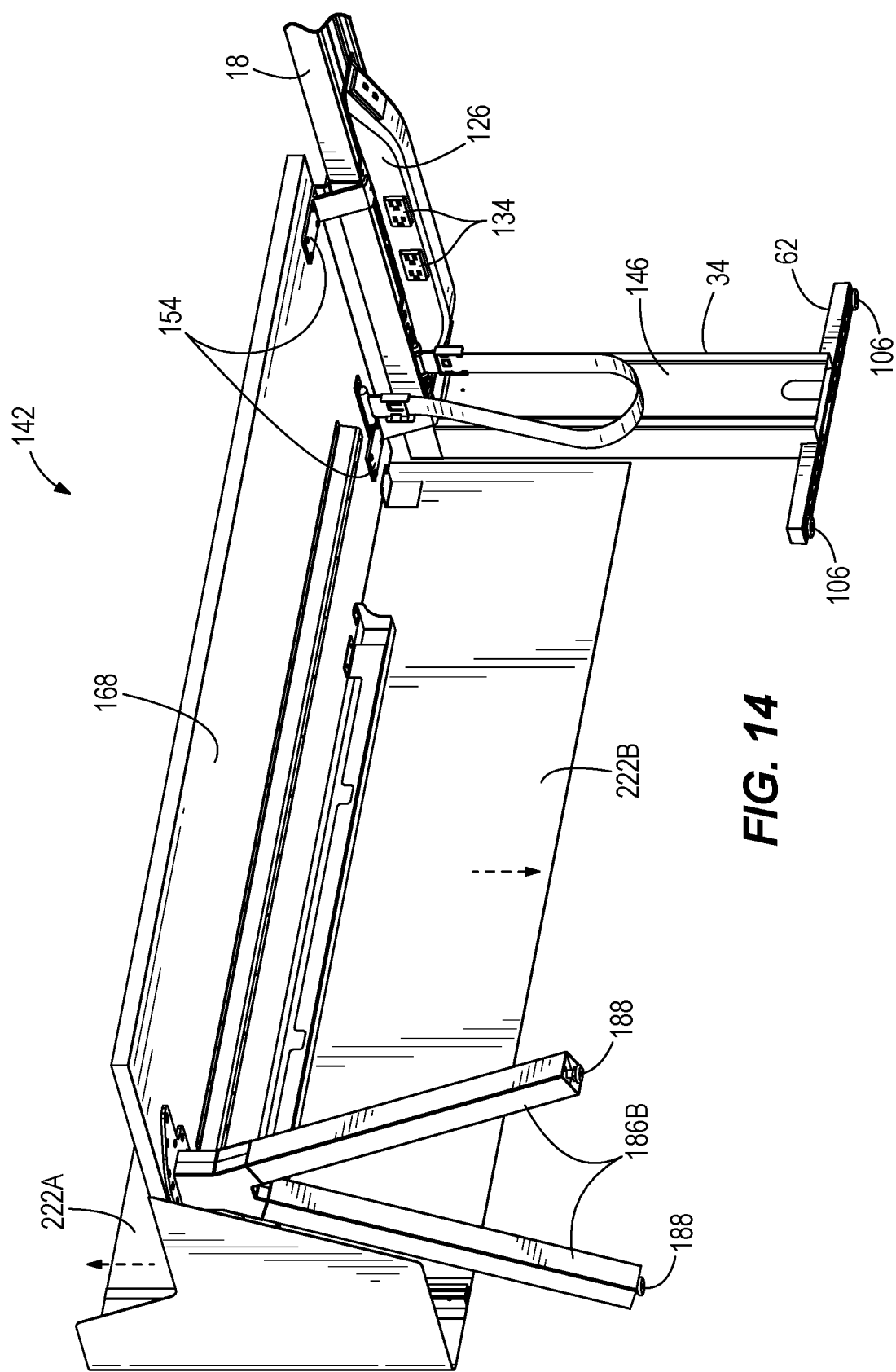
FIG. 14 is a bottom perspective view of a portion of the furniture system including a table and the chase.

With reference to FIGS. 13 and 14, the illustrated table 142 and the desks 218 include privacy and modesty screens 222A, 222B. The privacy and modesty screens 222A, 222B extend in a direction parallel to the vertical axis C. The illustrated privacy and modesty screens 222A, 222B are attached to and extend from the table 142 and desk 218. For example, as shown in FIG. 13, the modesty screen 222B extends from one of the sides of the desk 218 to an area below a bottom surface 284 of the desk 218. As shown in FIG. 14, the table 142 includes the modesty screen 222B and the privacy screen 222A extending from the second side 182 to an area above a top surface 260 (FIG. 9) of the table 142. Furthermore, the illustrated privacy and modesty screens 222A, 222B extend perpendicular to the longitudinal axis A. In this embodiment, the privacy and modesty screens 222A, 222B are coupled to more than one side of the tables 142 or desks 218.

The furniture items 190, such as the frame 192, the screen 202, the light 210, and the privacy and modesty screens 222A, 222B, are configured to provide separation between the workstations 22. In addition, the chase 18 and the furniture items 190, such as the frame 192, may provide an implied boundary. The furniture items 190 may be adjustably positioned on the chase 18 for extending the separation or the implied boundary between the workstations 22 along the longitudinal axis A. The tables 142 and/or the desks 218 may include the privacy and modesty screens 222A, 222B for further providing separation between the workstations 22 and the surrounding environment. As such, the furniture items 190 may be adjustably positioned relative to the chase 18 to provide at least some separation and privacy for the users of the adjacent workstations 22 in the furniture layout 14.

With reference to FIG. 9, the furniture system 10 includes an organizer, such as the shelf 206, coupled to the upper surface 28. The shelf 206 includes a surface 228 extending from the chase 18. The surface 228 may extend past either of the side walls 38A, 38B of the first and second sides 30C, 30D, respectively. The shelf 206 is configured to provide storage for personal items (e.g., writing utensils, cellular device, etc.). The shelf 206 may be further configured to provide a location for electrical devices being charged by the chase 18. As such, the shelf 206 may be positioned above or near the modular power units 126. Furthermore, the chase 18 may include other furniture items 190 that are organizers, such as a cubby, a book shelf, and the like.

With reference to FIGS. 1, 2, 9, and 10, some of the workstations 22 include a storage unit 214A-D. The storage units 214A-D are supported by the floor surface 56 (FIG. 3). In some embodiments, the storage unit 214A-D is at least partially positioned under the chase 18 and between the first and second ends 42A, 42B. Each storage unit 214A-D has a height J that is less than the height E of the chase 18 such that the storage units 214A-D may be positioned beneath the bottom surface 168 of the tables 142 (FIG. 9). Furthermore, the storage units 214A-D may also be positioned beneath the modular power units 126. In other words, the modular power units 126 are positioned between the lower surface 26 of the body 24 and an upper surface 268 of the storage units 214A-D (FIG. 10). The storage units 214A-D may be positioned at any location along the length B of the chase 18. In other embodiments, the storage units 214A-D are positioned adjacent the tables 142. For example, as shown in FIG. 2, the storage unit 214B' is positioned substantially perpendicular to the longitudinal axis A, and near the table 142. The storage units 214A-D are configured to provide storage for personal items (e.g., notebooks, writing utensils, etc.) of the user of the workstation 22.

Figure 12A:
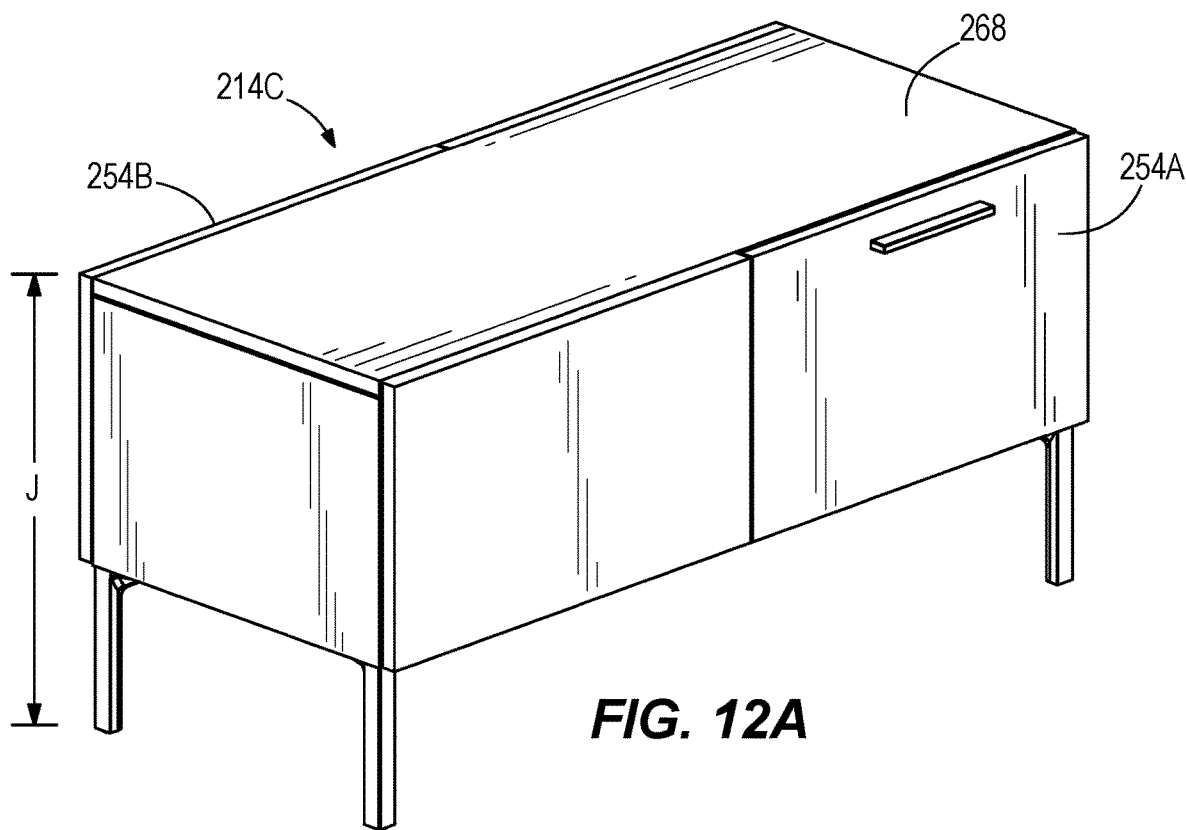
FIG. 12A is perspective view of a storage unit for use with the furniture system.
Figure 12B:
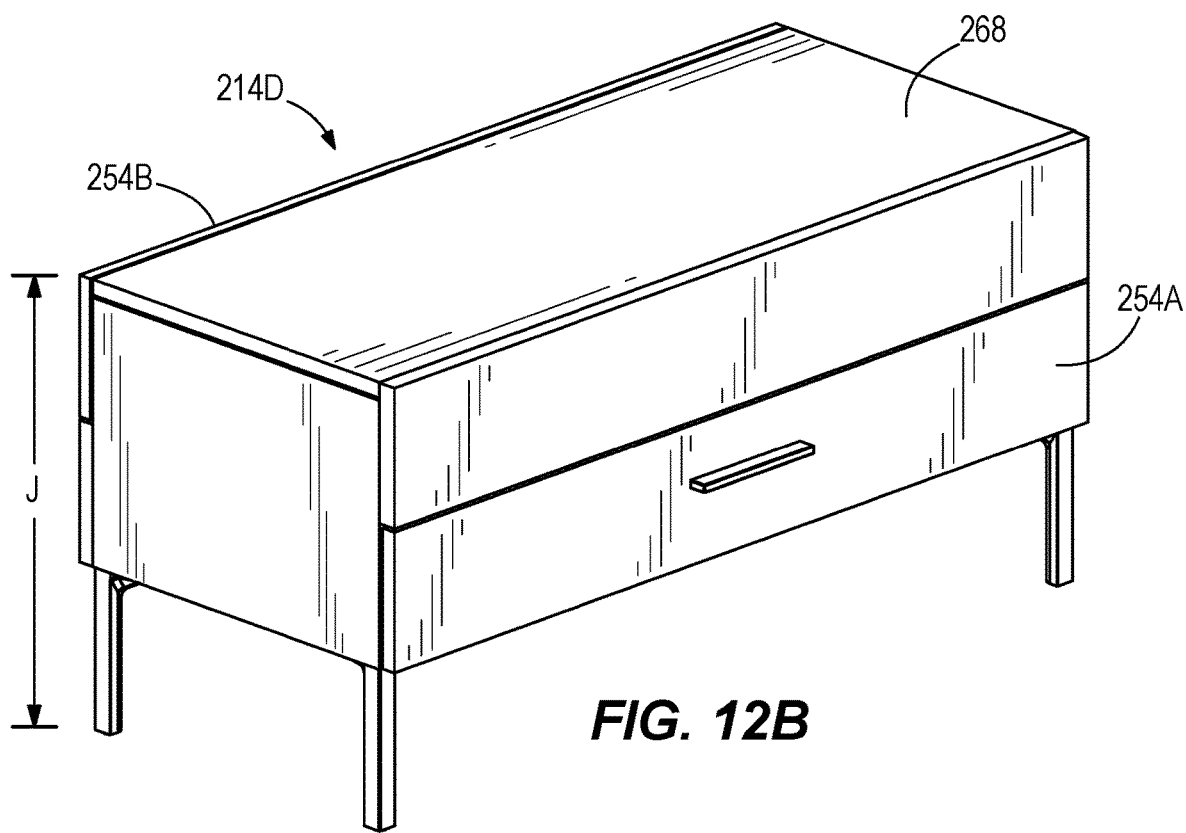
FIG. 12B is perspective view of another storage unit for use with the furniture system.

With reference to FIGS. 9, 10, 12A, and 12B, each storage unit 214A-D includes a plurality of storage spaces 254. The storage units 214A-D may be configured in at least four configurations. In some embodiments, the storage units 214C, 214D include two storage spaces 254 (FIGS. 12A-12B). In other embodiments, the storage units 214A-D may include more than two storage spaces 254. For example, the storage units 214A, 214B (FIGS. 10 and 9, respectively) include three storage spaces 254. The storage spaces 254 may be configured in different orientations within each storage unit 214A-D. For example, as shown in FIG. 12A, the storage spaces 254 are positioned horizontally adjacent relative to the longitudinal axis A. As shown in FIG. 12B, the storage spaces 254 are positioned vertically adjacent relative to the vertical axis C. Furthermore, the storage units 214A-D may include a combination of the configurations of the storage spaces 254.

With reference to FIGS. 12A and 12B, some of the illustrated storage units 214C, 214D are configured to provide storage on two opposite sides of the storage unit 214. Specifically, each storage unit 214C, 214D includes the plurality of storage spaces 254 configured to be accessed from the opposite sides of the storage unit 214. For example, each storage unit 214C, 214D includes a first storage space 254A positioned on one side and a second storage 254B positioned on the opposite side. The storage unit 214C, 214D may be positioned beneath the chase 18 such that the storage spaces 254A are configured to be accessed from the first side 30C of the chase 18, and the storage spaces 254B are configured to be accessed from the second side 30D of the chase 18. As such, the storage unit 214C, 214D is configured to provide storage to the users of different workstations 22. The storage units 214A-D may also be used to provide separation between the workstations 22.

With reference to FIG. 9, a mounting member 264 is coupled between the top surface 268 of the storage unit 214B and the lower surface 26 of the chase 18. The storage unit 214B thereby provides additional support for the chase 18 through the mounting member 264. In some embodiments, one or more of the storage units 214A-D may be used in addition to or as an alternative to any of the legs 34 of the chase 18. Any or all of the storage units 214A-D may have the mounting member 264 to support the chase 18.

With reference to FIG. 13, the furniture system 10 further includes a desk 218. The illustrated desk 218 may be positioned proximate the chase 18 and electrically coupled to one of the modular power units 126. Each desk includes a tabletop 270 including a front edge 272, a rear edge 274 opposite the front edge 272, a first side edge 276, and a second side edge 278. The first and second side edges 276, 278 extend between the front and rear edges 272, 274. The front edge 272 is configured to be adjacent the user of the workstation 22. The illustrated privacy and modesty screens 222A, 222B are coupled to the rear edge 274. For example, the illustrated desk 218 includes the modesty screen 222B coupled to the rear edge 274 and to the first and second side edges 276, 278. The desk 218 may be positioned in at least some of the workstations to form different configurations of the furniture system 10.

The desks 218 have openings 280 formed through the tabletops 270. The illustrated openings 280 have a generally rectangular shape; however, in other embodiments, the openings 280 may have any shape such as circular, hexagonal, and the like. The openings 280 extend through each tabletop 270. The windows 280 allow power cords to extend through the tabletops 270 to supply power to the other furniture items 190 positioned on the tabletops 270. As such, the desk 218 may be electrically coupled to the power outlets 134 of the modular power units 126. The tabletops 270 facilitate management of the power cords using the openings 280.

The desk 218 includes leg assemblies 282A, 282B. In the illustrated embodiment, the desk 218 includes two leg assemblies 282A, 282B. The first leg assembly 282A is positioned proximate to and inset from the first side edge 276, and the second leg assembly 282B is positioned proximate to and inset from the second side edge 278. The illustrated leg assemblies 282A, 282B are coupled to the bottom surface 284 of the tabletop 270. The desk 218 is separate from the chase 18 such that the leg assemblies 282A, 282B provide the support to each tabletop 270 of each desk 218. The leg assemblies 282A, 282B further include foot portions 290 (FIG. 13) similar to the foot portion 62 of the legs 34.

In the illustrated embodiment, the leg assemblies 282A, 282B include height adjustment mechanisms (e.g., an actuator and telescoping tubes) such that the leg assemblies 282A, 282B are operable to extend and retract. In other words, the leg assemblies 282A, 282B are adjustable to change the height of tabletop 270. As such, the desk 218 is a height-adjustable or sit-stand desk. Power for the adjustment mechanisms may be provided by one of the modular power units 126.

With continued reference to FIG. 13, the illustrated desk 218 includes storage elements 286A, 286B. In other embodiments, any or all of the tables 142 and/or the desks 218 may the storage elements 286A, B. The illustrated storage elements 286A, 286B are mounted to the bottom surface 284 of the tabletop 270. The storage elements 286A, 286B may be configured as drawers slidably attached to the tables 142 and/or the tabletops 270. The storage elements 286A, 286B may also be configured as shelves, ledges, and the like. The illustrated storage elements 286A, 286B have different sizes (e.g., the large storage unit 286A and the small storage element 286B in FIG. 13). The storage elements 286A, 286B are configured to provide suspended storage for the user of each workstation 22.

In the illustrated embodiment, the storage elements 286A, 286B are positioned outside of the leg members 186A, 186B or the leg assemblies 282A, 286B. More particularly, the desk 218 includes the first and second leg assemblies 282A, B proximate to and inset from the first and second side edges 276, 278, respectively. One of the storage elements 286A is positioned between the first side edge 276 and the first leg assembly 282A, and the other storage element 286B is positioned between the second side edge 278 and the second leg assembly 282B. As such, the storage elements 286A, 286B do not interfere with a user seated at the desk 18 and provide a clean aesthetic of the workstations 22.

The tables 142 and desks 218 may be further configured to support other relatively small furniture items 190 such as a monitor arm 288 (FIG. 2). The illustrated monitor arm 288 is supported by the table 142 and includes joints for rotating the stand to a plurality of positions. The monitor arm 288 may be configured to support electrical devices, such as computer monitors. The monitor arm 288 may also be positioned proximate the openings 280 such that power cords may extend through the monitor arm 288 to the electrical device for providing power to the electrical device.

Each workstation 22 may include any or all of the workstation accessories 50. In the illustrated embodiment, some of the furniture accessories 50 may be shared between the workstations 22, such as the storage units 214, the screens 202, etc. Each of the workstation accessories 50 may be selectively coupled to the chase 18 for providing adjustability of the workstations 22 for the users of the workstations 22. Power is supplied to each workstation 22 by the modular power units 126 beneath the chase 18 that are electrically coupled to power cables 114 within the chase 18. The length B of the chase 18 is adjustable, as well as the location of power distribution along the length B for further providing adjustability of the furniture system 10. As such, the furniture system 10 may be formed in a plurality of configurations, and each workstation 22 within the furniture system 10 may be formed in a plurality of configurations.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A furniture system comprising:
   an elongated chase including a body extending from a first end to a second end, the body having an upper surface and a lower surface, the body further having a first side wall and a second side wall extending between the upper surface and the lower surface;
   a first leg coupled to the lower surface of the body;
   a second leg coupled to the lower surface of the body and spaced apart from the first leg;
   power cables positioned within a cavity of the body; and
   a modular power unit including a power outlet electrically coupled to the power cables and a housing coupled to and extending from the lower surface of the body, the housing having a first outer face adjacent the first side wall and a second outer face adjacent the second side wall, the power outlet supported by the housing at the first outer face,
   wherein the first outer face of the modular power unit is spaced inwardly from the first side wall of the body such that the modular power unit is recessed relative to the first side wall.

2. The furniture system of claim 1, wherein the elongated chase defines a longitudinal axis extending through the first end and the second end, and wherein the power outlet extends outwardly from the first outer face such that an end surface of the power outlet is between the first side wall and the first outer face in a direction perpendicular to the longitudinal axis.

3. The furniture system of claim 1, wherein the housing of the modular power unit is couplable to the lower surface of the body in different locations.

4. The furniture system of claim 1, wherein the elongated chase defines a longitudinal axis extending through the first end and the second end, wherein the body has a first length measured in a direction parallel to the longitudinal axis, and wherein the modular power unit has a second length measured in a direction parallel to the longitudinal axis that is less than the first length.

5. The furniture system of claim 1, further comprising a storage unit positioned beneath the lower surface of the body between the first leg and the second leg, wherein the storage unit includes an upper surface, and wherein the modular power unit is positioned between the lower surface of the body and the upper surface of the storage unit such that the storage unit is positioned beneath the modular power unit.

6. The furniture system of claim 1, wherein the second outer face of the modular power unit is spaced inwardly from the second side wall of the body such that the modular power unit is recessed relative to the second side wall, and wherein the second outer face includes another power outlet that is electrically coupled to the power cables.

7. The furniture system of claim 1, wherein the upper surface of the body defines a plurality of slots extending between the first end and the second end, and further comprising a first workstation accessory coupled to one of the plurality of slots and a second workstation accessory coupled to another of the plurality of slots adjacent the first workstation accessory such that at least portions of the first and second workstation accessories overlap along a length of the elongated chase.

8. The furniture system of claim 1, wherein the power cables extend from the cavity and through the first leg for connection to a building's power supply.

9. A furniture system comprising:
   an elongated chase including a body extending from a first end to a second end, the body having an upper surface and a lower surface, the upper surface defining a first slot and a second slot spaced apart from the first slot, the chase defining a longitudinal axis extending through the first end and the second end;
   a first leg coupled to the lower surface of the body;
   a second leg coupled to the lower surface of the body and spaced apart from the first leg;
   power cables positioned within a cavity of the body, the power cables configured to connect to a building's power supply;
   a first workstation accessory removably coupled to the first slot and extending upwardly from the upper surface of the elongated chase; and
   a second workstation accessory removably coupled to the second slot and extending upwardly from the upper surface the elongated chase,
   wherein the first workstation accessory and the second workstation accessory at least partially overlap each other in a direction perpendicular to the longitudinal axis.

10. The furniture system of claim 9, further comprising a modular power unit coupled to the lower surface of the body at least partially beneath the first workstation accessory, wherein the modular power unit includes a power outlet electrically coupled to the power cables, and wherein the power outlet of the modular power unit and the first workstation accessory are positioned on a same side of the longitudinal axis.

11. The furniture system of claim 10, wherein the power outlet is a first power outlet supported on a first outer face of a housing of the modular power unit, wherein the modular power unit further includes a second power outlet supported on a second outer face of the housing opposite the first outer face, and wherein the first workstation accessory and the first power outlet are positioned on a first side of the elongated chase relative to the longitudinal axis and the second workstation accessory and the second power outlet are positioned on a second side of the elongated chase relative to the longitudinal axis opposite the first side.

12. The furniture system of claim 10, wherein the first workstation accessory is a table, and wherein the modular power unit is positioned at least partially beneath the table.

13. The furniture system of claim 9, further comprising a storage unit positioned beneath the lower surface of the body between the first leg and the second leg, wherein the storage unit includes a first storage space configured to be accessed from a first side of the elongated chase, and a second storage space configured to be accessed from a second side of the elongated chase.

14. The furniture system of claim 9, wherein each of the first slot and the second slot extends from the first end to the second end of the body.

15. The furniture system of claim 9, wherein the elongated chase further includes a third slot defined by the upper surface of the body of the elongated chase and spaced apart from each of the first slot and the second slot, the furniture system further comprising a third workstation accessory removably coupled to the third slot and extending upwardly from the upper surface of the elongated chase.

16. The furniture system of claim 9, wherein the first workstation accessory is one selected from a group consisting of a table, a frame, a screen, a shelf, a light, a storage unit, a monitor arm, and a cable management member, and wherein the second workstation accessory is another selected from the group consisting of a table, a frame, a screen, a shelf, a light, a storage unit, a monitor arm, and a cable management member.

17. A furniture system comprising:
an elongated chase including a body extending from a first end to a second end, the body having an upper surface and a lower surface, the upper surface defining a slot extending from the first end to the second end, the chase defining a longitudinal axis extending through the first end and the second end;
a first leg coupled to the lower surface of the body;
a second leg coupled to the lower surface of the body and spaced apart from the first leg;
power cables positioned within a cavity of the body, the power cables configured to connect to a building's power supply; and
a T-shaped light removably coupled to the slot and extending upwardly from the upper surface of the elongated chase, the T-shaped light including a first portion extending perpendicular to the longitudinal axis and a second portion extending parallel to the longitudinal axis.

18. The furniture system of claim 17, wherein the slot is one of a plurality of slots defined by the upper surface of the elongated chase, wherein the T-shaped light is removably coupled to one of the plurality of slots, and the furniture system further comprises a workstation accessory removably coupled to another of the plurality of slots adjacent the T-shaped light such that at least portions of the T-shaped light and the workstation accessory overlap along a length of the elongated chase.

19. The furniture system of claim 18, wherein the workstation accessory is a table extending outwardly away from the elongated chase.

20. The furniture system of claim 17, wherein the body of the elongated chase has a first length measured in a direction parallel to the longitudinal axis, and wherein the second portion of the T-shaped light has a second length measured in a direction parallel to the longitudinal axis that is less than the first length.

* * * * *